(12) United States Patent
Kageyama

(10) Patent No.: US 7,683,975 B2
(45) Date of Patent: Mar. 23, 2010

(54) AUTOMATIC FOCUSING APPARATUS

(75) Inventor: Yasuhiro Kageyama, Tokorozawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 291 days.

(21) Appl. No.: 11/806,008

(22) Filed: May 29, 2007

(65) Prior Publication Data

US 2007/0279365 A1    Dec. 6, 2007

(30) Foreign Application Priority Data

May 31, 2006    (JP)    ............... 2006-151394

(51) Int. Cl.
  *G02F 1/133*   (2006.01)
  *G09G 3/36*   (2006.01)
  *G03B 17/00*   (2006.01)
(52) U.S. Cl. ............... 349/33; 345/100; 396/72
(58) Field of Classification Search ............... None
   See application file for complete search history.

(56) References Cited

U.S. PATENT DOCUMENTS

| | | | | |
|---|---|---|---|---|
| 4,795,248 | A * | 1/1989 | Okada et al. ............... | 351/158 |
| 2002/0181126 | A1* | 12/2002 | Nishioka ............... | 359/726 |
| 2006/0171696 | A1* | 8/2006 | Murata et al. ............... | 396/72 |

FOREIGN PATENT DOCUMENTS

| JP | 2-11068 | 2/1982 |
|---|---|---|
| JP | 1-15188 | 4/1983 |
| JP | 2-44248 | 9/1985 |
| JP | 3047082 | 3/1993 |
| JP | 2742741 | 6/1993 |

OTHER PUBLICATIONS

Kentaro Hanma et al. "Contour Detection Autofocus System," Institute of Television Engineers of Japan, Technical Report, Nov. 29, 1982, pp. 7-12.

* cited by examiner

*Primary Examiner*—Tina M Wong
(74) *Attorney, Agent, or Firm*—Finnegan, Henderson, Farabow, Garrett & Dunner, L.L.P.

(57) ABSTRACT

An object of the present invention is to provide an automatic focusing apparatus which can reduce the time required to detect focused position in accordance with the operating environment by adjusting the voltage applied to a liquid crystal lens. The apparatus includes a liquid crystal lens whose focal length varies with an applied voltage, a liquid crystal lens driving unit which applies a prescribed voltage to the lens, an optical-to-electrical converter which produces an image signal from an optical image passed through the lens, a temperature sensor which detects temperature near the lens, and a control unit which extracts a plurality of focus signals by adjusting the prescribed voltage and controlling the driving unit based on the temperature or on the image signal acquisition period of the converter, and which controls the driving unit based on the extracted plurality of focus signals so that a maximum focus signal is achieved.

3 Claims, 22 Drawing Sheets

Fig. 7

| TYPE | CENTER VOLTAGE: Vinner [V] | OUTER VOLTAGE: Vouter [V] | FOCAL LENGTH: f [mm] |
|---|---|---|---|
| 1 | 1 | 5 | 100 |
| 2 | 1 | 4 | 200 |
| 3 | 1 | 3 | 500 |
| 4 | 1 | 2 | 1000 |
| 5 | 1 | 1 | ∞ |
| 6 | 2 | 1 | -1000 |
| 7 | 3 | 1 | -500 |
| 8 | 4 | 1 | -200 |
| 9 | 5 | 1 | -100 |

Types 1–4: CONVEX LENS
Types 6–9: CONCAVE LENS

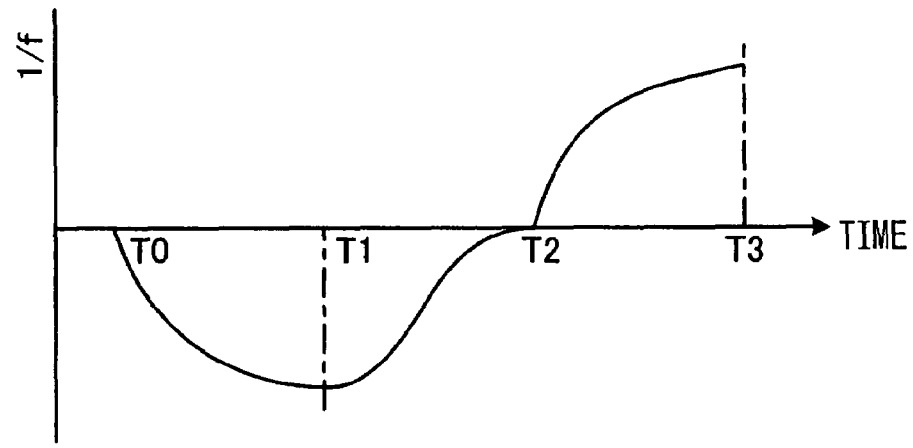

Fig.12A

TABLE 1

| LOWER THAN 40Hz, 20°C OR HIGHER | Vinner | Vouter |
|---|---|---|
| INITIAL STATE | 3V | 3V |
| TO CONVEX STATE | 3V | 5V |
| TO FLAT STATE | 3V | 3V |
| TO CONCAVE STATE | 5V | 3V |

Fig.12B

TABLE 2

| LOWER THAN 40Hz, LOWER THAN 20°C | Vinner | Vouter |
|---|---|---|
| INITIAL STATE | 6V | 6V |
| TO CONVEX STATE | 6V | 8V |
| TO FLAT STATE | 6V | 6V |
| TO CONCAVE STATE | 8V | 6V |

Fig.12C

TABLE 3

| 40Hz OR HIGHER, 20°C OR HIGHER | Vinner | Vouter |
|---|---|---|
| INITIAL STATE | 4V | 4V |
| TO CONVEX STATE | 4V | 6V |
| TO FLAT STATE | 4V | 4V |
| TO CONCAVE STATE | 6V | 4V |

Fig.12D

TABLE 4

| 40Hz OR HIGHER, LOWER THAN 20°C | Vinner | Vouter |
|---|---|---|
| INITIAL STATE | 8V | 8V |
| TO CONVEX STATE | 8V | 10V |
| TO FLAT STATE | 8V | 8V |
| TO CONCAVE STATE | 10V | 8V |

Fig.12E

|  | LOWER THAN 40Hz | 40Hz OR HIGHER |
|---|---|---|
| 20°C OR HIGHER | 1 | 3 |
| LOWER THAN 20°C | 2 | 4 |

Fig.14

| TEMPERATURE (°C) | RESPONSE TIME (MILLISECONDS) | | SUCCESSIVE EXTRACTION PROCESSING TIME (SECONDS) | NUMBER OF SAMPLINGS (AT 20Hz) DURING PERIOD tf FOR COLLECTIVE EXTRACTION | NUMBER OF SAMPLINGS (AT 40Hz) DURING PERIOD tf FOR COLLECTIVE EXTRACTION |
|---|---|---|---|---|---|
| | tf | tr | | | |
| 40 | 100 | 150 | 1 | 4 | 8 |
| 35 | 120 | 180 | 1.2 | 4 | 9 |
| 30 | 150 | 225 | 1.5 | 6 | 12 |
| 25 | 200 | 300 | 2 | 8 | 16 |
| 20 | 250 | 375 | 2.5 | 10 | 20 |
| 15 | 300 | 450 | 3 | 12 | 24 |
| 10 | 400 | 600 | 4 | 16 | 32 |
| 5 | 500 | 750 | 5 | 20 | 40 |
| 0 | 650 | 975 | 6.5 | 26 | 52 |

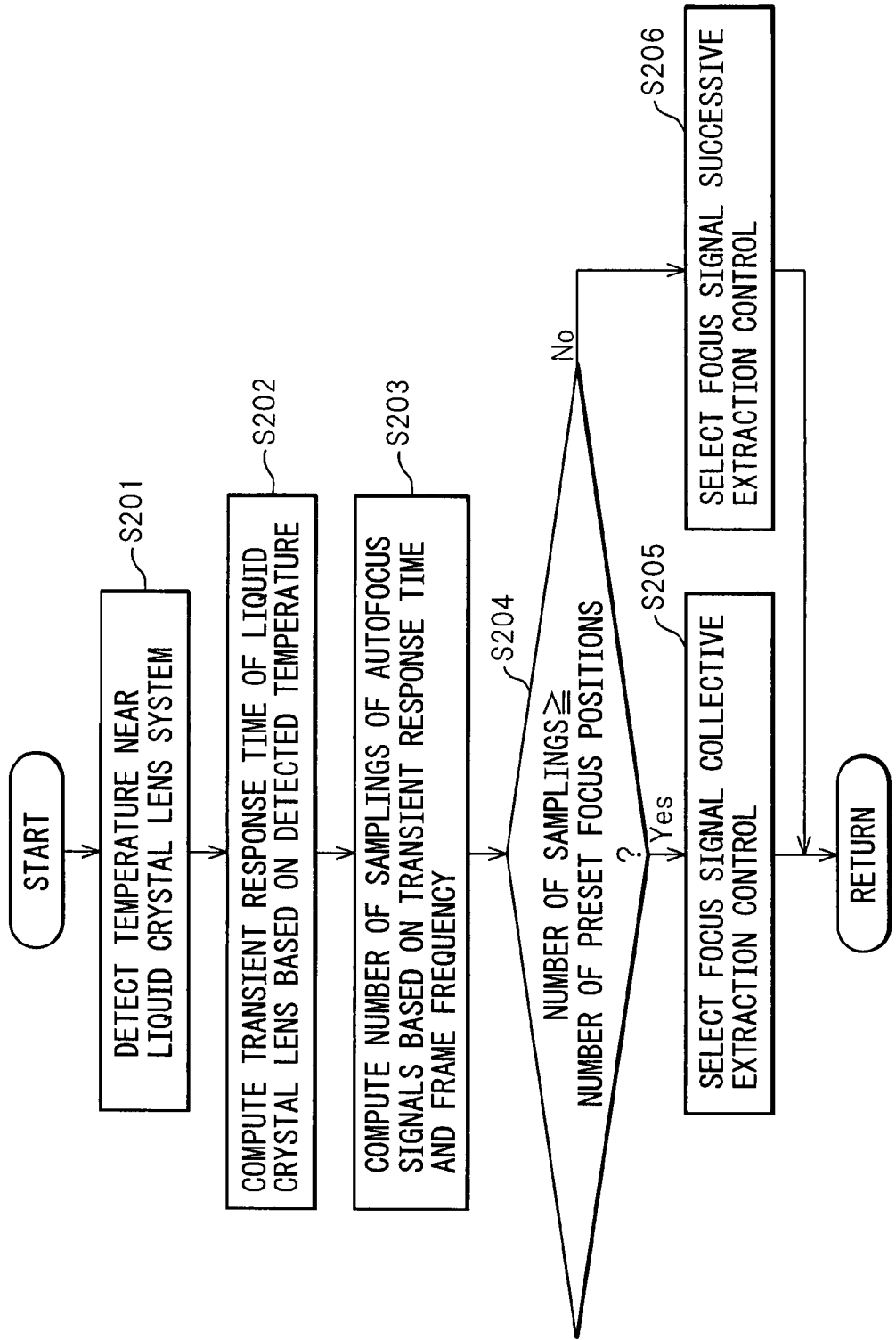

Fig.18A

| | LENS LEVEL | Vouter | Vinner |
|---|---|---|---|
| CONVEX | 0 | 7.50 | 5.50 |
| CONVEX | 1 | 7.06 | 5.50 |
| CONVEX | 2 | 6.61 | 5.50 |
| CONVEX | 3 | 6.17 | 5.50 |
| CONVEX | 4 | 5.72 | 5.50 |
| CONCAVE | 5 | 5.28 | 5.50 |
| CONCAVE | 6 | 4.83 | 5.50 |
| CONCAVE | 7 | 4.39 | 5.50 |
| CONCAVE | 8 | 3.94 | 5.50 |
| CONCAVE | 9 | 3.50 | 5.50 |

Fig.18B

| | LENS LEVEL | Vouter | Vinner |
|---|---|---|---|
| CONVEX | 0 | 3.50 | 1.50 |
| CONVEX | 1 | 3.50 | 1.94 |
| CONVEX | 2 | 3.50 | 2.39 |
| CONVEX | 3 | 3.50 | 2.83 |
| CONVEX | 4 | 3.50 | 3.28 |
| CONCAVE | 5 | 3.50 | 3.72 |
| CONCAVE | 6 | 3.50 | 4.17 |
| CONCAVE | 7 | 3.50 | 4.61 |
| CONCAVE | 8 | 3.50 | 5.06 |
| CONCAVE | 9 | 3.50 | 5.50 |

Fig. 21

| | ELAPSED TIME FROM START OF TRANSIENT RESPONSE (MILLISECONDS) | LENS LEVEL |
|---|---|---|
| TEMPERATURE CONDITION 1 | 150 | 0 |
| | 250 | 1 |
| | 330 | 2 |
| | 450 | 3 |
| | 600 | 4 |
| | 680 | 5 |
| | 780 | 6 |
| | 900 | 7 |
| | 1000 | 8 |
| TEMPERATURE CONDITION 2 | 160 | 0 |
| | 270 | 1 |
| | 360 | 2 |
| | 490 | 3 |
| | 650 | 4 |
| | 740 | 5 |
| | 850 | 6 |
| | 980 | 7 |
| | 1090 | 8 |
| TEMPERATURE CONDITION 3 | 170 | 0 |
| | 290 | 1 |
| | 380 | 2 |
| | 520 | 3 |
| | 680 | 4 |
| | 790 | 5 |
| | 900 | 6 |
| | 1050 | 7 |
| | 1160 | 8 |
| TEMPERATURE CONDITION 4 | 200 | 0 |
| | 330 | 1 |
| | 430 | 2 |
| | 580 | 3 |
| | 750 | 4 |
| | 880 | 5 |
| | 1000 | 6 |
| | 1170 | 7 |
| | 1300 | 8 |

AUTOMATIC FOCUSING APPARATUS

The Applicant claims the right to priority based on Japanese Patent Application JP 2006-151394, filed on May 31, 2006, and the entire content of JP 2006-151394 is hereby incorporated by reference.

FIELD OF THE INVENTION

The present invention relates to an automatic focusing apparatus, and more particularly to an automatic focusing apparatus that uses a liquid crystal lens for adjusting focal length, wherein the automatic focusing apparatus extracts a plurality of focus signals corresponding to various focusing states from an image signal obtained from an optical image focused through the liquid crystal lens during the transient response of the liquid crystal lens, and detects focused position by detecting the peak value of these focus signals.

BACKGROUND OF THE INVENTION

Traditionally, a method that achieves focusing by moving a lens or lenses has been widely employed to implement a focusing system for varying the focal length or focus position of an optical system. However, this method requires the use of a lens driving mechanism, and therefore has the drawbacks that the focusing system becomes complex, and that relatively large power is required to drive the lens driving motor. This type of focusing system has the further drawback that impact resistance is generally low. In view of this, as a focusing system that does not require the use of a lens driving mechanism, a system has been proposed that achieves focusing by varying the refractive index of a liquid crystal lens (for example, refer to patent document 1).

The liquid crystal lens for implementing this prior art system is constructed by sandwiching a liquid crystal layer between two glass substrates having a patterned electrode and a common electrode. The patterned electrode comprises a center electrode and a plurality of ring electrodes, and each ring electrode is connected to the center electrode by a voltage drop resistor. A leader electrode connected to the center electrode is electrically isolated from the ring electrodes, and a variable resistor is connected to the leader electrode via a power amplifier. On the other hand, to a leader electrode connected to the ring electrode (the outer electrode), a variable resistor is connected via an amplifier. An AC power source is connected in parallel to these variable resistors. The variable resistors cause the AC voltage supplied from the AC power source to drop.

A voltage profile is formed across the liquid crystal layer by the voltage signals applied to the leader electrodes and the variable resistors that causes the voltage to drop. By adjusting the respective variable resistors, various voltage profiles can be generated across the liquid crystal layer.

A contour detection method is known for implementing an autofocus (automatic focusing) system for a video camera; this method extracts information corresponding to an image out-of-focus condition directly from the captured video image, and controls the lens to minimize the out-of-focus condition by using a hill climbing method (for example, refer to non-patent document 1). Various kinds of autofocusing apparatuses using this hill climbing control method have been proposed (for example, refer to patent documents 2, 3, 4, and 5).

To date, however, no reports have been published on the use of the hill climbing control method in achieving focusing by varying the refractive index of a liquid crystal lens. One possible reason for this is that, in the case of a liquid crystal lens, it takes considerable time to detect a focused position by the mounting climbing control. Assuming, for example, that there are 10 preset focus positions covering a range from near to far, a search is then made for a peak in the out-of-focus condition information in sequence from near to far or from far to near, and a maximum of 10 positions must be searched before the peak is found. In doing so, the time required to detect the focused position is compared between the method that moves the lens and the method that uses a liquid crystal lens.

In the method that moves the lens, first the lens is moved to a point corresponding to a certain position to acquire information corresponding to an out-of-focus condition at that position, and then the lens is moved to a point corresponding to the next position to acquire information corresponding to an out-of-focus condition; this action is repeatedly performed. In this case, the processing time per position is short, for example, about 67 milliseconds, so that the time required to detect the focused position is about 0.67 second (=67 milliseconds/position×10 positions) at the longest.

On the other hand, in the method that uses the liquid crystal lens, the refractive index of the liquid crystal lens is varied by varying the voltage (drive voltage) that is applied to the liquid crystal lens to drive the liquid crystal lens. Accordingly, first a drive voltage corresponding to a certain position is applied to the liquid crystal lens to acquire information corresponding to an out-of-focus condition at that position, and then a drive voltage corresponding to the next position is applied to the liquid crystal lens to acquire information corresponding to an out-of-focus condition; this action is repeatedly performed.

However, since there is generally a finite delay before the liquid crystal can respond to a change in applied drive voltage, the process for acquiring the out-of-focus condition information has to wait until the response of the liquid crystal settles after the drive voltage has been changed. Accordingly, the processing time per position is long, for example, about 500 milliseconds, so that it takes a maximum of about five seconds (500 milliseconds/position×10 positions) to detect the focused position.

Further, according to patent document 1, voltage is applied across the voltage drop resistors in the liquid crystal lens and, as a matter of course, there are cases where lower voltage is applied to one end than the other end. For example, if it is desired to operate the liquid crystal lens as a convex lens, lower voltage is applied to one leader electrode, and higher voltage to the other leader electrode.

In this case, depending on the liquid crystal material used for the liquid crystal layer, the time required until the transient response ends in the liquid crystal to which the lower voltage is applied becomes longer than the time required until the transient response ends in the liquid crystal to which the higher voltage is applied. In this way, when operating the liquid crystal lens as a convex lens, there will be no problem if the liquid crystal equally responds to applied voltages across the entire area of the liquid crystal layer. However, when there is a portion where the transient response is slower, the time required before the liquid crystal lens can function as a convex lens is determined by the response time of the liquid crystal to which lower voltage is applied.

In particular, when it is required to maximize the power of the liquid crystal lens, the voltage difference between the center electrode and the outer electrode must be maximized. This requires that voltage be as low as possible and yet exert an effective force on the liquid crystal molecules in the liquid crystal layer be applied to the side to which the lower voltage is applied, and this has led to the problem that it takes a long time to achieve a lens having a desired refractive index profile in that portion (i.e., until the transient response ends).

Furthermore, to increase the power of the liquid crystal lens as much as possible, the birefringence of the liquid crystal material must be made larger, or the thickness of the liquid crystal layer must be increased. However, a liquid crystal lens constructed in this manner has had the same problem as described above, that is, the response of the liquid crystal is slow, and it takes a long time to achieve a lens having a desired refractive index profile.

Further, the response speed of the liquid crystal to an applied voltage varies depending on the temperature. As a result, there has been the problem that, depending on the operating environment, it takes a long time for the liquid crystal lens to have a desired refractive index profile.

[Patent Document 1] Japanese Patent No. 3047082

[Patent Document 2] Japanese Utility Patent Publication No. H02-44248

[Patent Document 3] Japanese Patent No. 2742741

[Patent Document 4] Japanese Examined Patent Publication No. H01-15188

[Patent Document 5] Japanese Examined Patent Publication No. H02-11068

[Non-patent Document 1] Kentaro Hanma and four others, "Contour Detection Autofocus System," Institute of Television Engineers of Japan, Technical Report, Nov. 29, 1982, pp. 7-12.

SUMMARY OF THE INVENTION

It is an object of the present invention to provide an automatic focusing apparatus wherein provisions are made to be able to detect focused position at a sufficiently high speed for practical use by collectively extracting a plurality of focus signals corresponding to various focusing states during the transient response of a liquid crystal lens and then detecting the maximum value of the focus signals.

It is another object of the present invention to provide an automatic focusing apparatus wherein provisions are made to be able to reduce the time required to detect focused position in accordance with the operating environment by adjusting the voltage applied to the liquid crystal lens.

An automatic focusing apparatus according to the present invention includes a liquid crystal lens whose focal length varies with an applied voltage, a liquid crystal lens driving unit which applies a prescribed voltage to the liquid crystal lens, an optical-to-electrical converter which produces an image signal from an optical image passed through the liquid crystal lens, a temperature sensor which detects temperature near the liquid crystal lens, and a control unit which extracts a plurality of focus signals by adjusting the prescribed voltage and controlling the liquid crystal lens driving unit based on the temperature near the liquid crystal lens or on an image signal acquisition period of the optical-to-electrical converter, and which controls the liquid crystal lens driving unit based on the extracted plurality of focus signals so that a maximum focus signal is achieved.

Preferably, in the automatic focusing apparatus according to the present invention, the control unit adjusts the prescribed voltage in such a manner that the prescribed voltage increases as the temperature near the liquid crystal lens decreases.

Or, preferably, in the automatic focusing apparatus according to the present invention, the control unit adjusts the prescribed voltage in such a manner that the prescribed voltage increases as the image signal acquisition period becomes shorter.

Preferably, in the automatic focusing apparatus according to the present invention, the control unit extracts the plurality of focus signals in accordance with focus signal collective extraction control in which the image signal output from the optical-to-electrical converter is sampled with the image signal acquisition period while causing the liquid crystal lens to undergo a transient response by applying the prescribed voltage by controlling the liquid crystal lens driving unit.

Preferably, in the automatic focusing apparatus according to the present invention, the control unit extracts the plurality of focus signals in accordance with focus signal successive extraction control in which the image signal output from the optical-to-electrical converter is sampled after liquid crystal in the liquid crystal lens has fully responded to the voltage applied to the liquid crystal lens when the voltage is varied by controlling the liquid crystal lens driving unit.

Preferably, in the automatic focusing apparatus according to the present invention, the control unit can extract the plurality of focus signals either in accordance with focus signal collective extraction control in which the image signal output from the optical-to-electrical converter is sampled with the image signal acquisition period while causing the liquid crystal lens to undergo a transient response by applying the prescribed voltage by controlling the liquid crystal lens driving unit, or in accordance with focus signal successive extraction control in which the image signal output from the optical-to-electrical converter is sampled after liquid crystal in the liquid crystal lens has fully responded to the voltage applied to the liquid crystal lens when the voltage is varied by controlling the liquid crystal lens driving unit, wherein the control unit either the focus signal collective extraction control or the focus signal successive extraction control, based on the temperature or on the image signal acquisition period.

Preferably, in the automatic focusing apparatus according to the present invention, the control unit estimates a time required for the transient response of the liquid crystal lens based on the temperature near the liquid crystal lens, and computes the number of focus signals obtainable during the transient response by dividing the estimated time by the image signal acquisition period, wherein when the number of focus signals is not smaller than a prescribed number, the focus signal collective extraction control is selected, while when the number of focus signals is smaller than the prescribed number, the focus signal successive extraction control is selected.

An automatic focusing apparatus according to another embodiment of the present invention includes a liquid crystal lens whose focal length varies with an applied voltage, a liquid crystal lens driving unit which applies a prescribed voltage to the liquid crystal lens, an optical-to-electrical converter which produces an image signal from an optical image passed through the liquid crystal lens, a temperature sensor which detects a temperature near the liquid crystal lens, and a control unit which can extract a plurality of focus signals either in accordance with focus signal collective extraction control in which the image signal output from the optical-to-electrical converter is sampled with the image signal acquisition period while causing the liquid crystal lens to undergo a transient response by applying the prescribed voltage by controlling the liquid crystal lens driving unit, or in accordance with focus signal successive extraction control in which the image signal output from the optical-to-electrical converter is sampled after liquid crystal in the liquid crystal lens has fully responded to the voltage applied to the liquid crystal lens when the voltage is varied by controlling the liquid crystal lens driving unit, wherein the control unit selects either the focus signal collective extraction control or the focus signal successive extraction control based on the temperature or on the image signal acquisition period, and controls the liquid crystal lens driving unit based on the extracted plurality of focus signals so that a maximum focus signal is achieved.

An automatic focusing apparatus according to still another embodiment of the present invention includes a liquid crystal lens whose focal length varies with an applied voltage, a liquid crystal lens driving unit which applies a prescribed voltage to the liquid crystal lens, an optical-to-electrical converter which produces an image signal from an optical image passed through the liquid crystal lens, a temperature sensor which detects a temperature near the liquid crystal lens, and a control unit which adjusts the prescribed voltage based on the temperature near the liquid crystal lens or on an image signal acquisition period of the optical-to-electrical converter, acquires a signal representing the focal length of the liquid crystal lens corresponding to a focus signal maximum value from focus signal extracting unit for extracting a plurality of focus signals by sampling with the image signal acquisition period the image signal being output from the optical-to-electrical converter, and controls the liquid crystal lens driving unit based on the acquired signal.

According to the present invention, the liquid crystal lens is used for adjusting the focal length, the plurality of focus signals corresponding to various focusing states are extracted in a collective manner during the transient response of the liquid crystal lens, and the maximum value of the focus signals is detected; in this way, the focused position can be detected at a sufficiently high speed for practical use.

Further, according to the present invention, by adjusting the voltage applied to the liquid crystal lens, the time required for focusing can be reduced in accordance with the operating environment.

BRIEF DESCRIPTION OF THE DRAWINGS

These and other features and advantages of the present invention will be better understood by reading the following detailed description, taken together with the drawings wherein:

FIG. 7 is a table showing by way of example the relationship between the focal length of the liquid crystal lens under static conditions and the drive voltage applied to it;

FIG. 9A is a diagram showing another example of the temporal variation pattern of the voltage applied to the outer electrode of the liquid crystal lens used in the automatic focusing apparatus according to the present invention;

FIG. 9B is a diagram showing another example of the temporal variation pattern of the voltage applied to the center electrode of the liquid crystal lens used in the automatic focusing apparatus according to the present invention;

FIG. 9C is a diagram showing the variation of the reciprocal of the focal length of the liquid crystal lens when the voltages shown in FIGS. 9A and 9B are applied;

FIG. 12A is one example of a table showing combinations of the drive voltages to be applied to the liquid crystal lens;

FIG. 12B is another example of a table showing combinations of the drive voltages to be applied to the liquid crystal lens;

FIG. 12C is still another example of a table showing combinations of the drive voltages to be applied to the liquid crystal lens;

FIG. 12D is yet another example of a table showing combinations of the drive voltages to be applied to the liquid crystal lens;

FIG. 12E is a lookup table used to select an appropriate one of the voltages tables shown in FIGS. 12A to 12D;

FIG. 14 is a table showing response time, processing time for focus signal successive extraction, and number of samplings for focus signal collective extraction, as compared between various temperatures, when voltage is applied to the liquid crystal;

FIG. 15 is a flowchart illustrating the sequence of autofocusing operations performed by the automatic focusing apparatus according to a second embodiment;

FIG. 18A is a table showing specific examples of voltage values when varying the applied voltages in accordance with the control shown in FIG. 17A;

FIG. 18B is a table showing by way of example the relationship between the lens level and the reference voltages applied to the center electrode and outer electrode during standby;

FIG. 21 is one example of a table that provides the mapping between the time elapsed from the start of transient response and the lens level.

DETAILED DESCRIPTION OF THE PREFERRED EMBODIMENTS

An automatic focusing apparatus according to the present invention will be described below with reference to the drawings. It will, however, be noted that the present invention is not limited by the description given herein, but embraces the inventions described in the appended claims and their equivalents.

Embodiment 1

Figure 1:
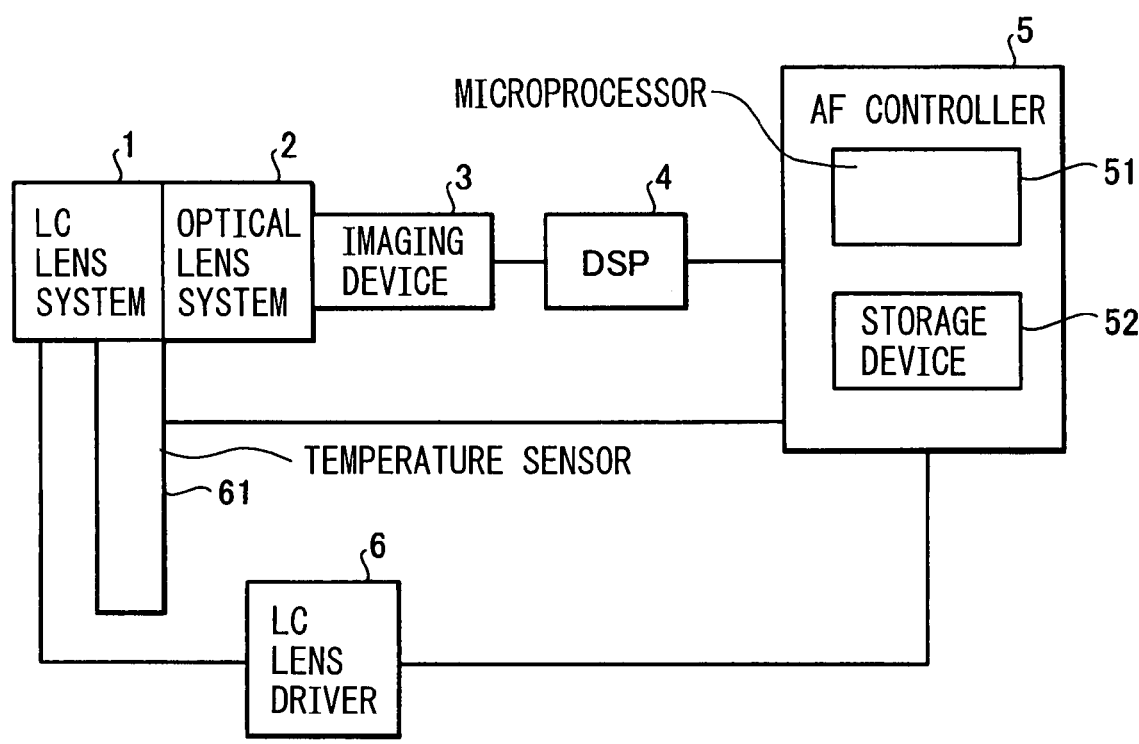
FIG. 1 is a block diagram showing the basic configuration of an automatic focusing apparatus according to the present invention.

FIG. 1 is a block diagram showing the basic configuration of an automatic focusing apparatus. As shown in FIG. 1, the automatic focusing apparatus comprises a liquid crystal (LC) lens system 1, an optical lens system 2, an imaging device 3, a DSP (digital signal processor) 4, an autofocus (AF) controller 5, a liquid crystal lens driver 6, and a temperature sensor 61. The liquid crystal lens system 1 is constructed by combining a liquid crystal lens for P waves with a liquid crystal lens for S waves. The optical lens system 2 comprises a diaphragm, a group of lenses, and an infrared cutoff filter, through which an image of an object located at a prescribed distance from the optical lens system 2 is focused onto the imaging device 3. The imaging device 3 comprises an image sensor constructed from a solid-state imaging device, such as a CCD or CMOS imager, and an analog-digital converter. The temperature sensor 61 is mounted near the liquid crystal lens system 1, and is used to estimate the temperature of the liquid crystal lens system 1 by measuring the temperature near the liquid crystal lens system 1.

The optical image focused through the liquid crystal lens system 1 and the optical lens system 2 is converted into an electrical signal by the image sensor in the imaging device 3. The electrical signal output from the image sensor is converted into a digital signal by the analog-digital converter. The DSP 4 performs processing on the digital signal output from the analog-digital converter, and obtains a focus signal (hereinafter called the autofocus signal) by extracting a high-frequency component from an image captured of a specific area. The autofocus controller 5 performs focus signal collective extraction control to extract a plurality of autofocus signals output from the DSP 4 during a transient response that occurs in the liquid crystal lens system 1 when the drive voltage applied to it is varied. The plurality of autofocus signals respectively have signal values corresponding to various focusing states. Further, based on the temperature information obtained from the temperature sensor 61 and/or the frame frequency of the imaging device 3, the autofocus controller 5 adjusts the voltage applied to the liquid crystal lens system 1. Here, the autofocus controller 5 acquires the frame frequency of the imaging device 3 from an exposure controller (not shown) that controls the exposure time of the imaging device 3, the aperture diameter of the diaphragm in the optical lens system 2, etc.

The "focus signal collective extraction control" described above refers, for example, to a method of control in which the plurality of autofocus signals are extracted by sampling the image signal at a prescribed frequency as it is generated from the optical image passed through the liquid crystal lens while the liquid crystal lens is undergoing a transient response to respond to a prescribed voltage applied from the liquid crystal lens driver. A specific method for implementing the focus signal collective extraction control will be described later.

Based on the plurality of autofocus signals thus extracted, the autofocus controller 5 controls the driving condition of the liquid crystal lens system 1 so as to maximize the autofocus signal level.

The autofocus controller 5 includes a microprocessor 51 which performs the above sequence of control operations and a storage device 52. The storage device 52 includes a read-only memory area (ROM area) which stores programs to be executed by the microprocessor 51, as well as various relations necessary for obtaining optimum drive voltages, etc., and a writable memory area (RAM area) which the microprocessor 51 uses as a work area. The liquid crystal lens driver 6 applies a voltage to the liquid crystal lens system 1 based on a control signal output from the autofocus controller 5.

The process performed by the autofocus controller 5 will be described in detail later. The imaging device 3 and the DSP 4 correspond to an optical-to-electrical converter. The autofocus controller 5 corresponds to a control unit for driving a liquid crystal lens control unit. The liquid crystal lens driver 6 corresponds to the liquid crystal lens control unit.

Figure 2:
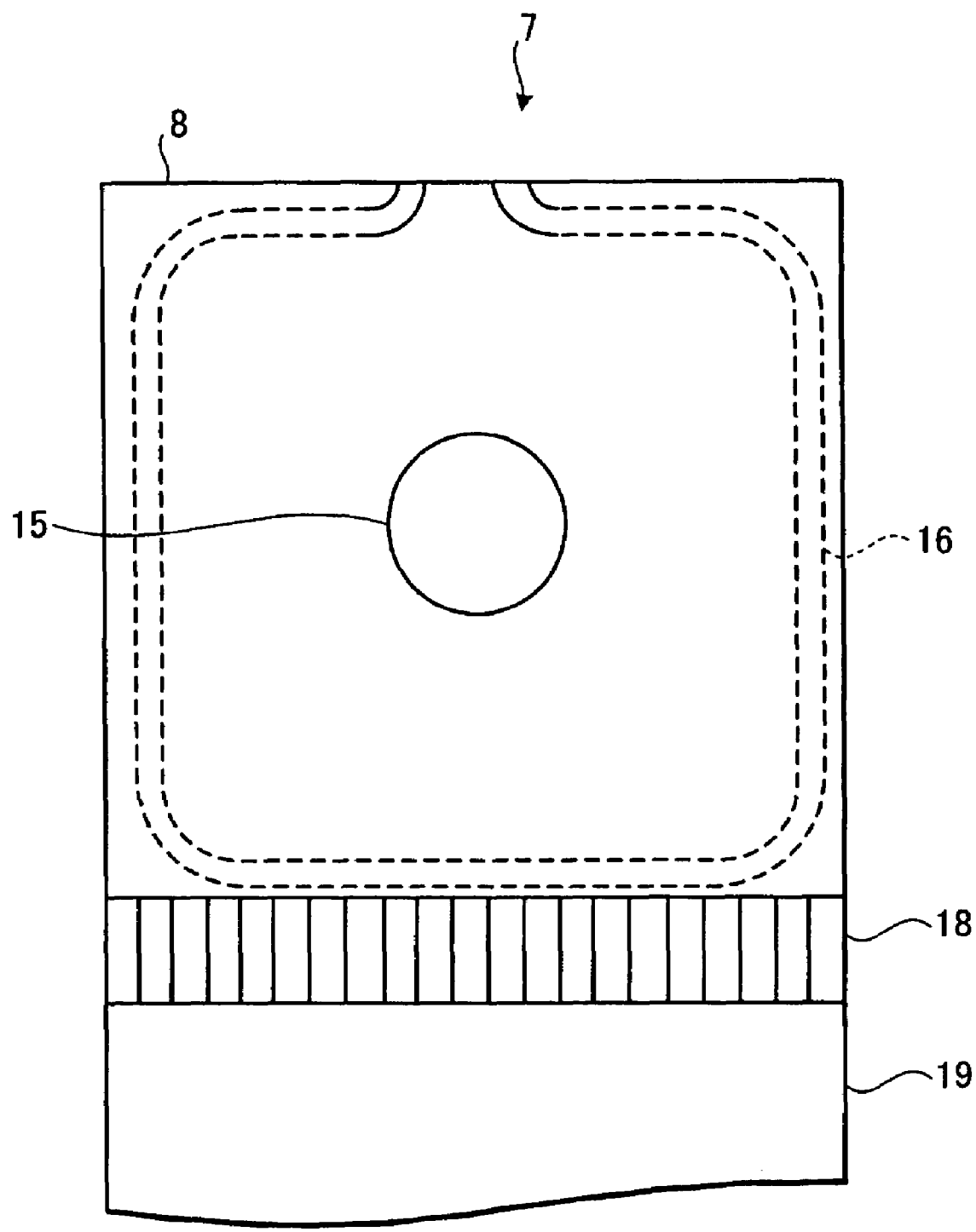
FIG. 2 is a front view of a liquid crystal lens.
Figure 3:
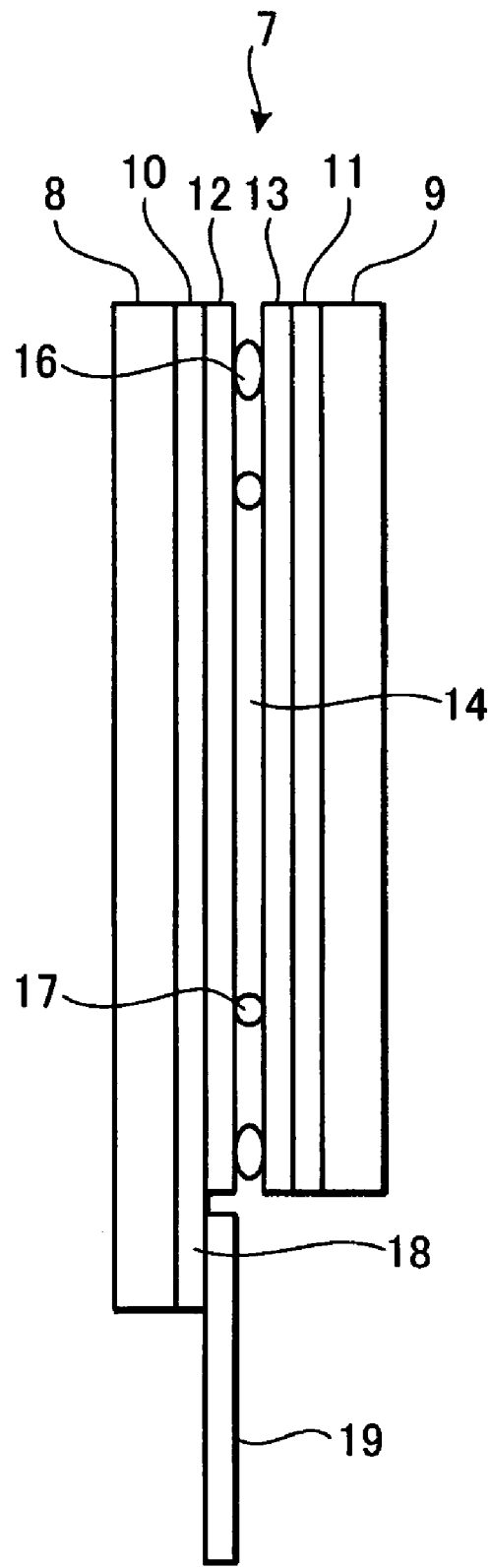
FIG. 3 is a cross-sectional view of the liquid crystal lens.

FIGS. 2 and 3 are a front view and a cross-sectional view, respectively, showing the cell structure of the liquid crystal lens. As shown in the figures, the liquid crystal lens 7 comprises a pair of opposing glass substrates 8 and 9, a patterned electrode 10 and a common electrode 11 disposed opposite each other on the inside surfaces of the glass substrates 8 and 9, alignment films 12 and 13 disposed facing each other on the inside surfaces of the patterned electrode 10 and the common electrode 11, and a liquid crystal layer 14, for example, of homogenous alignment, confined between the alignment films 12 and 13.

The liquid crystal lens for P waves and the liquid crystal lens for S waves are identical in structure, but their liquid crystal layers 14 are oriented at right angles to each other. When the refractive index profile of the liquid crystal lens for P waves is changed, light whose plane of polarization coincides with the orientation direction of the liquid crystal lens for P waves is affected by the change in the refractive index profile, but light whose plane of polarization is at right angles to the orientation direction of the liquid crystal lens for P waves is unaffected by the change in the refractive index profile. The same can be said of the liquid crystal lens for S waves.

Accordingly, two liquid crystal lenses oriented at right angles to each other, i.e., the liquid crystal lens for P waves and the liquid crystal lens for S waves, must be provided. The liquid crystal lens for P waves and the liquid crystal lens for S waves are both driven by a drive voltage of the same waveform. The drive voltage is, for example, a pulse-height modulated (PHM) or pulse-width modulated (PWM) AC voltage.

A lens area 15 where the refractive index varies with the applied voltage is provided in the center of the liquid crystal panel. The liquid crystal panel is sealed around its periphery by a sealing member 16. The thickness of the liquid crystal layer 14 is held constant by means of spacer members 17. A flexible printed circuit board (FPC) 19 is connected to electrode leads 18 of the patterned electrode 10 by using an anisotropic conductive film. Some of the electrode leads 18 are electrically isolated from the patterned electrode 10 and are connected to the common electrode 11.

The dimensions of the liquid crystal lens 7 are shown below by way of example, though they are not specifically limited to the examples shown. Each side of the glass substrates 8 and 9 measures several millimeters to a dozen or so millimeters, for example, 10 millimeters. For the glass substrate 8 on which the patterned electrode 10 is formed, however, this dimension excludes the portion that covers the electrode leads 18 of the patterned electrode 10. The thickness of each of the glass substrates 8 and 9 is several hundred microns, for example, 300 μm. The thickness of the liquid crystal layer 14 is from a dozen or so microns to several tens of microns, for example, 23 μm. The diameter of the lens area 15 is a few millimeters, for example, 2.4 mm.

Figure 4:
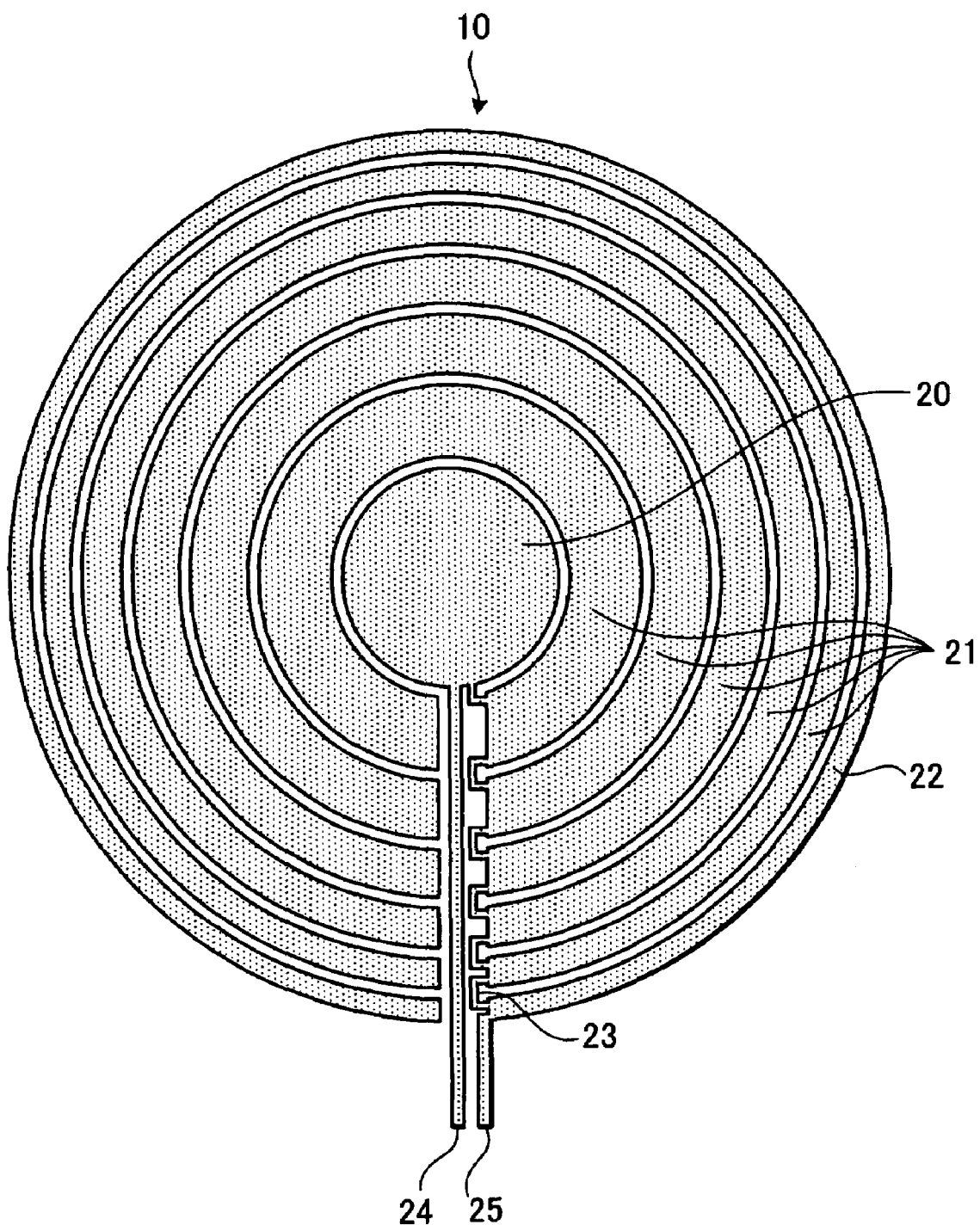
FIG. 4 is a front view of a patterned electrode.

FIG. 4 is a front view showing the structure of the patterned electrode 10. As shown in FIG. 4, the patterned electrode 10 comprises a circular shaped center electrode 20 and a plurality of C-shaped ring electrodes 21 and 22 formed in concentric circles of different radii. Empty space is provided between the center electrode 20 and the innermost ring electrode 21, as well as between each pair of adjacent ring electrodes 21, 22. The connection between the center electrode 20 and the innermost ring electrode 21 and the connection between each pair of adjacent ring electrodes 21, 22 are each made via a ring connecting part 23.

A center leader electrode 24 extends radially from the center electrode 20 in such a manner as not to contact any of the ring electrodes 21, 22 or the ring connecting parts 23 (that is, in such a manner as to be electrically isolated from them), and terminates at a position radially outward of the outermost ring electrode 22 (hereinafter called the outer electrode 22). On the other hand, an outer leader electrode 25 extends radially outwardly from the outer electrode 22 in such a manner as to be electrically isolated from the other electrodes. The pattern of the patterned electrode 10 shown in FIG. 4 is disposed in such a manner as to be superimposed on the lens area 15.

The voltage value at the center electrode 20, the voltage value at each of the ring electrodes 21 arranged between the center electrode 20 and the outer electrode 22, and the voltage value at the outer electrode 22, each with respect to the common electrode 11, differ from one another in accordance with the voltages applied to the center leader electrode 24 and the outer leader electrode 25, respectively. That is, a voltage profile is generated in the lens area 15 by the patterned electrode 10. When the voltage profile is varied, the refractive index profile of the liquid crystal lens 7 varies, and the liquid crystal lens 7 can thus be made to function as a convex lens, parallel glass plates, or a concave lens.

The dimensions and characteristic values of various parts of the patterned electrode 10 are shown below by way of example, though they are not specifically limited to the examples shown. The total number of electrodes, including the center electrode 20 and the outer electrode 22 as well as the ring electrodes arranged between the center electrode 20 and the outer electrode 22, is, for example, 27. The diameter of the center electrode 20, the width of each ring electrode 21, and the width of the outer electrode 22 are chosen so that a desired refractive index profile can be obtained across the lens area 15. The space provided between adjacent ones of the center electrode 20, the ring electrodes 21, and the outer electrode 22 is, for example, 3 μm in width. The resistance value of each ring connecting part 23 is, for example, 1 kΩ.

Figure 5A:
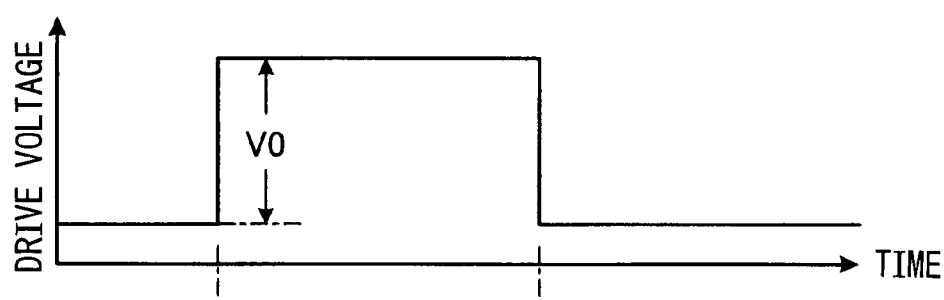
FIG. 5A is a diagram showing one example of a drive voltage applied to liquid crystal.
Figure 5B:
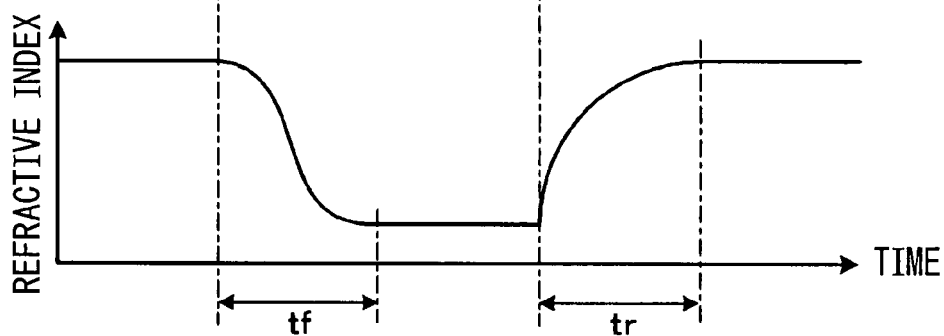
FIG. 5B shows the variation of refractive index when the drive voltage shown in FIG. 5A is applied to the liquid crystal.

Next, a description will be given of how the refractive index changes when a voltage is applied to the liquid crystal while light whose plane of polarization coincides with the orientation direction of the liquid crystal is passing through the liquid crystal. As shown in FIGS. 5A and 5B, when a drive voltage V0 is applied to the liquid crystal from the outside (FIG. 5A), the refractive index of the liquid crystal changes to the state that matches the applied drive voltage V0 after a delay of time tf from the rise timing of the drive voltage V0 (FIG. 5B). The refractive index of the liquid crystal returns to the original state after a delay of time tf from the fall timing of the drive voltage V0 (FIG. 5B). The times tf and tr each indicate the period during which the liquid crystal is undergoing a transient response; during this period, the refractive index of the liquid crystal gradually changes. As earlier noted, the drive voltage V0 is, for example, a pulse-height modulated (PHM) or pulse-width modulated (PWM) AC voltage.

It is assumed, for example, that the liquid crystal lens 7 and the patterned electrode 10 have the above-described dimensions and characteristic values. It is also assumed that a nematic liquid crystal whose refractive indexes for extraordinary and ordinary rays, ne and no, are 1.75 and 1.5, respectively, and whose birefringence Δn is 0.25, is used for the liquid crystal layer 14.

Next, the focus signal collective extraction control will be described. The autofocus controller 5 samples the image signal at the frame frequency as it is generated from the optical image passed through the liquid crystal lens system 1 and the optical lens system 2 while the liquid crystal is undergoing a transient response. That is, the frame frequency is used as the image signal sampling frequency. Then, the autofocus controller 5 obtains a autofocus signal by extracting a high-frequency component from an image captured of a specific area. Based on a plurality of autofocus signals thus obtained, the autofocus controller 5 determines the focal length of the liquid crystal lens system 1 at which the autofocus signal level becomes maximum. The autofocus controller 5 applies a voltage to the liquid crystal lens system 1 through the liquid crystal lens driver 6 so as to achieve the focal length corresponding to the maximum level of the autofocus signal.

Figure 6A:
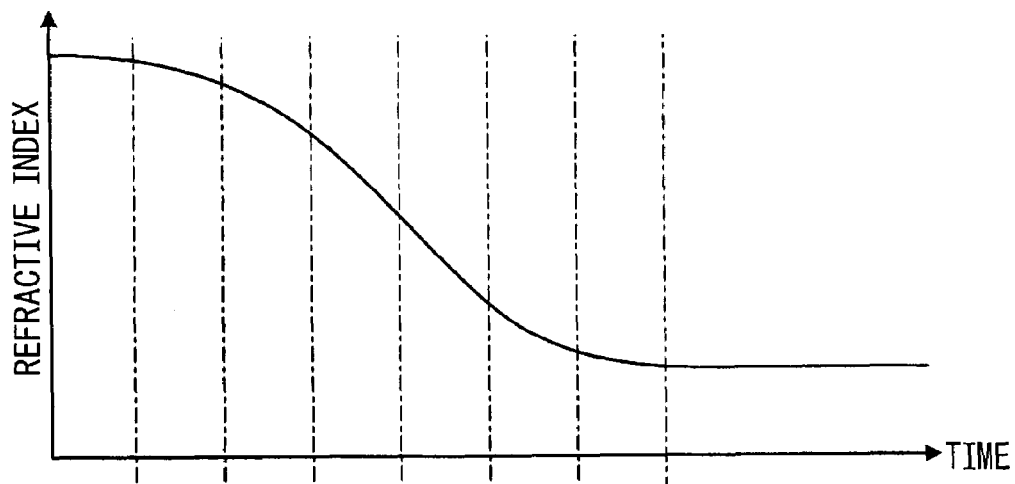
FIG. 6A is a diagram showing how the refractive index of the liquid crystal changes during a transient response period.
Figure 6B:
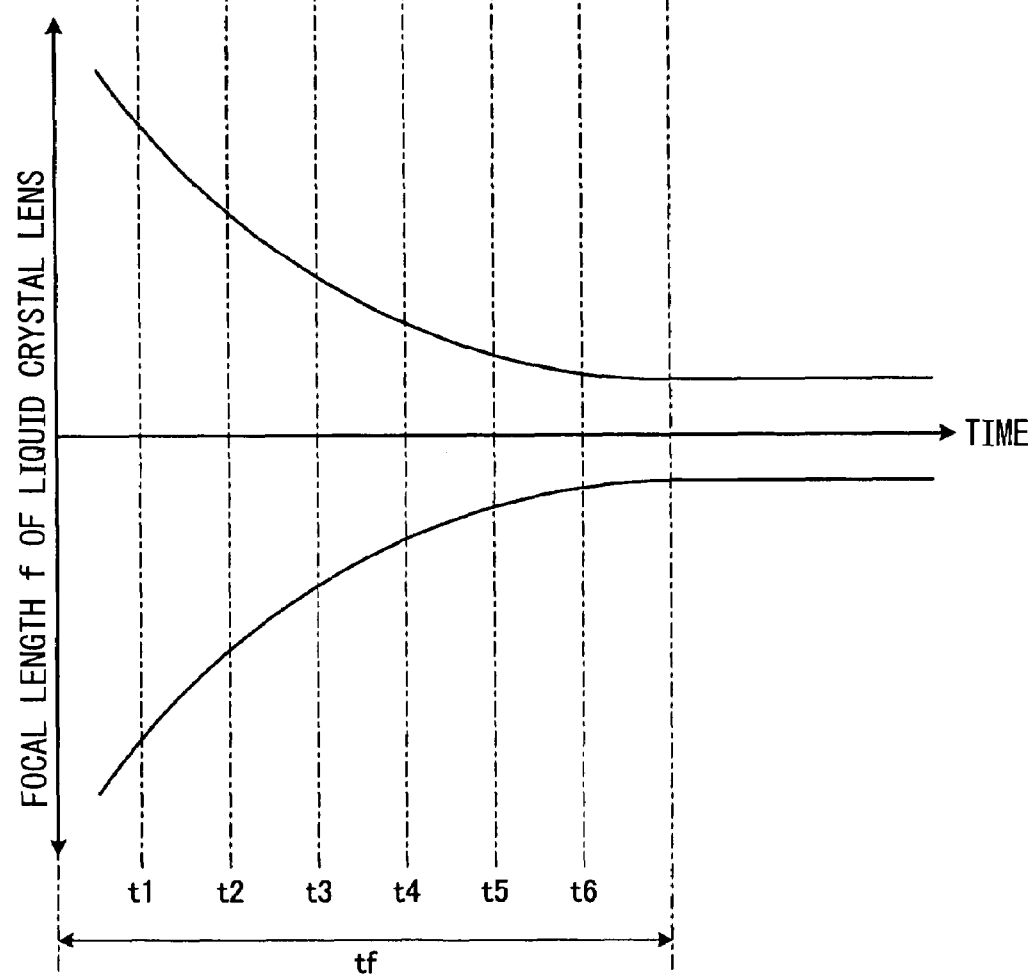
FIG. 6B is a diagram showing how the focal length of the liquid crystal lens changes during the transient response period.

FIGS. 6A and 6B show how the refractive index of the liquid crystal and the focal length of the liquid crystal lens 7 change during the transient response period tf at the rising of the drive voltage.

The refractive index of the liquid crystal changes during the transient response period tf, as shown, for example, in FIG. 6A. Toward the end of the transient response period tf, the refractive index settles to a constant value, so that the refractive indexes of the liquid crystal portions corresponding to the center electrode 20, ring electrodes 21, and outer electrode 22 of the liquid crystal lens 7 also settle to respective constant values. Accordingly, at the end of the transient response period tf, the refractive index profile of the liquid crystal lens 7 is set to a certain shape, and the focal length f of the liquid crystal lens 7 thus settles as shown in FIG. 6B to a certain constant value that corresponds to the refractive index profile.

In FIG. 6B, the lines drawn above and below the horizontal axis represent how the focal length f changes when the liquid crystal lens 7 is set to function as a convex lens and a concave lens, respectively. For convenience of explanation, in the first embodiment, the focal length f when the liquid crystal lens 7 is set to function as a convex lens is expressed by a positive number, and the focal length f when the liquid crystal lens 7 is set to function as a concave lens is expressed by a negative number. In this case, when the focal length f of the liquid crystal lens 7 is at positive or negative infinity, the liquid crystal lens 7 functions as parallel glass plates.

In the focus signal collective extraction control, the autofocus controller 5 samples the image signal at times t1, t2, t3, t4, t5, and t6 during the transient response period tf until the focal length f of the liquid crystal lens 7 settles to a constant value. At each sample timing, the liquid crystal lens 7 exhibits a different focal length f. Therefore, during one transient response period of the liquid crystal lens 7, the autofocus controller 5 can sample the image signal as it is generated from the optical image passed through the liquid crystal lens 7 whose focal length f is successively changing, and can thus extract a plurality of autofocus signals corresponding to various focusing states.

Here, the sampling frequency ts is synchronized, for example, to the frame frequency. The autofocus controller 5 may be configured to sample the image signal during the transient response period tr at the falling of the liquid crystal lens 7. Further, the number of samplings is not limited to six.

The relationship between the sampling time and the focal length of the liquid crystal lens 7 is predetermined, for example, the focal length of the liquid crystal lens 7 at the first sampling time t1 is f1, the focal length of the liquid crystal lens 7 at the second sampling time t2 is f2, and so on. This relationship is stored, for example, in the ROM area of the storage device 52 provided within the autofocus controller 5.

Accordingly, the microprocessor 51 in the autofocus controller 5 can determine the focal length of the liquid crystal lens 7 at each sampling time, based on the time at which the image signal is sampled during the transient response period of the liquid crystal lens 7. From this, the autofocus controller 5 can obtain the correspondence between the focal length of the liquid crystal lens 7 and the autofocus signal level, and can thus determine the focal length of the liquid crystal lens 7 at which the autofocus signal level becomes maximum, that is, the focal length when focusing is correctly achieved.

Furthermore, the relationship between the focal length f of the liquid crystal lens 7 under static conditions and the drive voltage applied to the liquid crystal lens 7 in order to set the focal length f of the liquid crystal lens 7 to a designated value is also predetermined, for example, the voltage values Vouter and Vinner applied to the outer electrode 22 and the center electrode 20 of the liquid crystal lens 7 in order to achieve the focal length f1 of the liquid crystal lens 7 under static conditions, the values Vouter and Vinner applied in order to achieve the focal length f2 of the liquid crystal lens 7 under static conditions, and so on. This relationship also is stored, for example, in the ROM area of the storage device 52 provided within the autofocus controller 5.

Accordingly, the microprocessor 51 can determine the value of the drive voltage to be applied to the liquid crystal lens 7 in order to achieve focusing, that is, in order to set the focal length of the liquid crystal lens 7 to the point at which the autofocus signal level becomes maximum. FIG. 7 shows by way of example the relationship between the focal length of the liquid crystal lens 7 under static conditions and the voltage applied to the liquid crystal lens 7 in order to set the focal length of the liquid crystal lens 7 to a designated value.

Next, a description will be given of a voltage pattern applied to the liquid crystal lens 7 when switching the liquid crystal lens 7 between a convex lens and a concave lens. When the voltage Vouter applied to the outer electrode 22 is higher than the voltage Vinner applied to the center electrode 20, the liquid crystal lens 7 is set as a convex lens and, in the opposite case, the liquid crystal lens 7 is set as a concave lens. Various voltage application patterns are possible, but the following description is given by taking two typical examples.

Figure 8A:
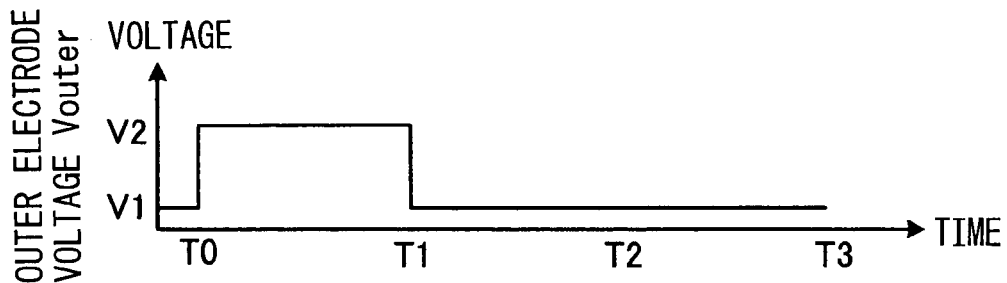
FIG. 8A is a diagram showing one example of the temporal variation pattern of the voltage applied to an outer electrode of the liquid crystal lens used in the automatic focusing apparatus according to the present invention.
Figure 8B:
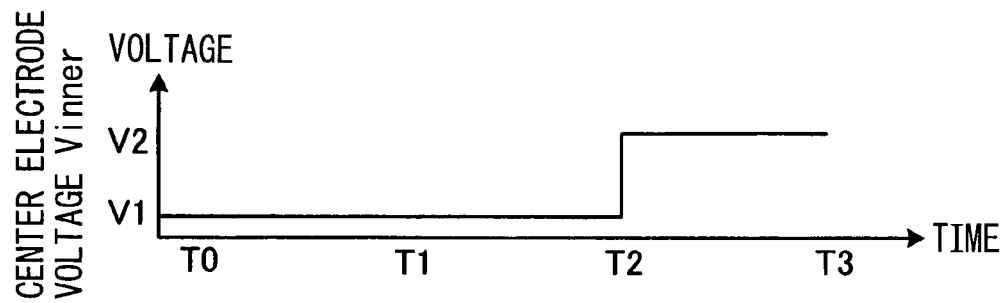
FIG. 8B is a diagram showing one example of the temporal variation pattern of the voltage applied to a center electrode of the liquid crystal lens used in the automatic focusing apparatus according to the present invention.
Figure 8C:
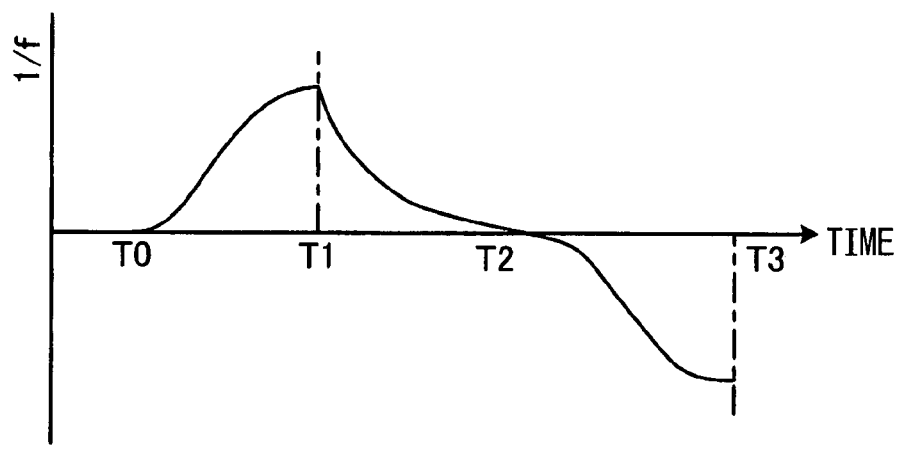
FIG. 8C is a diagram showing the variation of the reciprocal of the focal length of the liquid crystal lens when the voltages shown in FIGS. 8A and 8B are applied.

The first pattern is shown in FIGS. 8A to 8C. FIGS. 8A and 8B show the variations with time of the voltage Vouter applied to the outer electrode 22 and the voltage Vinner applied to the center electrode 20, respectively. In each figure, the abscissa represents the elapsed time, and the ordinate represents the voltage. FIG. 8C shows the variation of the reciprocal of the focal length f in the first pattern. In FIG. 8C, the abscissa represents the elapsed time, and the ordinate represents the reciprocal of the focal length f. As shown in FIGS. 8A and 8B, the voltage Vouter applied to the outer electrode 22 and the voltage Vinner applied to the center electrode 20 are both initially held at a first voltage V1. Next, at time T0, only the voltage Vouter to the outer electrode 22 is changed to a second voltage V2. Next, at time T1, only the voltage Vouter to the outer electrode 22 is changed to the first voltage V1. Subsequently, at time T2, only the voltage Vinner to the center electrode 20 is changed to the second voltage V2, and the operation is terminated at time T3.

The liquid crystal lens 7, which is in the condition of parallel glass plates at time T0, is first set as a convex lens whose lens power gradually increases during the period from time T0 to time T1, then as a convex lens whose lens power gradually decreases during the period from time T1 to time T2, and finally as a concave lens whose lens power gradually increases during the period from time T2 to time T3.

As shown in FIG. 8C, the value of 1/f is zero at time T0, reaches a positive maximum value at T1, crosses zero at T2, and reaches a negative maximum value at T3. Accordingly, the liquid crystal lens 7 becomes a convex lens with maximum lens power at time T1 and a concave lens with maximum lens power at time T3.

The second pattern is shown in FIGS. 9A to 9C. FIGS. 9A and 9B show the variations with time of the voltage Vouter applied to the outer electrode 22 and the voltage Vinner applied to the center electrode 20, respectively. In each figure, the abscissa represents the elapsed time, and the ordinate represents the voltage. FIG. 9C shows the variation of the reciprocal of the focal length f in the second pattern. In FIG. 9C, the abscissa represents the elapsed time, and the ordinate represents the reciprocal of the focal length f. As shown in FIGS. 9A and 9B, the voltage Vouter to the outer electrode 22 and the voltage Vinner to the center electrode 20 are both initially held at the second voltage V2. Next, at time T0, only the voltage Vouter to the outer electrode 22 is changed to the first voltage V1. Next, at time T1, only the voltage Vouter to the outer electrode 22 is changed to the second voltage V2. Subsequently, at time T2, only the voltage Vinner to the center electrode 20 is changed to the first voltage V1, and the operation is terminated at time T3.

The liquid crystal lens 7, which is in the condition of parallel glass plates at time T0, is first set as a concave lens whose lens power gradually increases during the period from time T0 to time T1, then as a concave lens whose lens power gradually decreases during the period from time T1 to time T2, and finally as a convex lens whose lens power gradually increases during the period from time T2 to time T3.

As shown in FIG. 9C, the value of 1/f is zero at time T0, reaches a negative maximum value at T1, crosses zero at T2, and reaches a positive maximum value at T3. Accordingly, the liquid crystal lens 7 becomes a concave lens with maximum lens power at time T1 and a convex lens with maximum lens power at time T3.

Next, a description will be given of how the plurality of autofocus signals obtained with the liquid crystal lens 7 set as a convex lens and as a concave lens are evaluated. Though not necessarily, it is assumed here that, in the configuration shown in FIG. 1, the focusing is adjusted by the optical lens system 2 so that objects at a distance L of 200 mm will be in focus when the liquid crystal lens system 1 is not provided.

In the configuration shown in FIG. 1, therefore, when the distance L to the object is shorter than 200 mm, the liquid crystal lens 7 is set to function as a convex lens. On the other hand, when the distance L to the object is longer than 200 mm, the liquid crystal lens 7 is set to function as a concave lens. As previously described, the focal length f when the liquid crystal lens 7 is set to function as a convex lens is expressed by a positive number, and the focal length f when the liquid crystal lens 7 is set to function as a concave lens is expressed by a negative number.

Accordingly, the power of the liquid crystal lens 7 in the case of a convex lens decreases as the value of f changes, for example, from 100 mm to 200 mm to 500 mm and to 1000 mm and, in the case of a concave lens, the power decreases as the value of f changes, for example, from −100 mm to −200 mm to −500 mm and to −1000 mm.

A description will be given by taking the first voltage application pattern as an example. FIGS. 10A to 10D and FIGS. 11A to 11D are diagrams for explaining the method of evaluating the autofocus signals in the first voltage application pattern. As shown in FIGS. 10A to 10C or FIGS. 11A to 11C, in the case of the first voltage application pattern, a plurality of autofocus signals, six in the illustrated example but not specifically limited to six, are obtained during the period from time T0 to T1 when the liquid crystal lens 7 is functioning as a convex lens.

Similarly, a plurality of autofocus signals, six in the illustrated example, but not specifically limited to six, are obtained during the period from time T2 to T3 when the liquid crystal lens 7 is functioning as a concave lens. In the illustrated example, when the voltage Vouter to the outer electrode 22 or the voltage Vinner to the center electrode 20 is changed, the sampling is started after a brief delay.

Figure 10A:
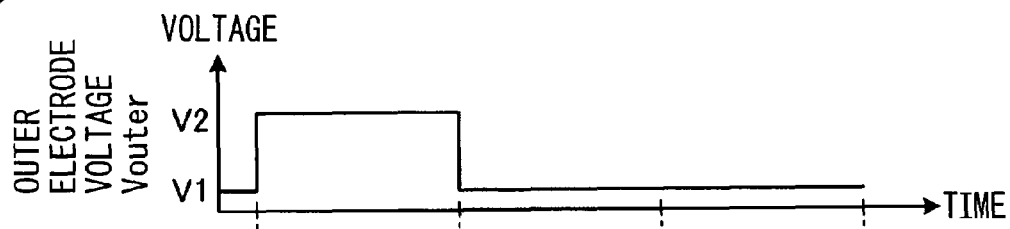
FIG. 10A is a diagram showing one example of the temporal variation pattern of the voltage applied to the outer electrode of the liquid crystal lens shown in FIG. 8A.
Figure 10B:
FIG. 10B is a diagram showing one example of the temporal variation pattern of the voltage applied to the center electrode of the liquid crystal lens shown in FIG. 8B.
Figure 10C:
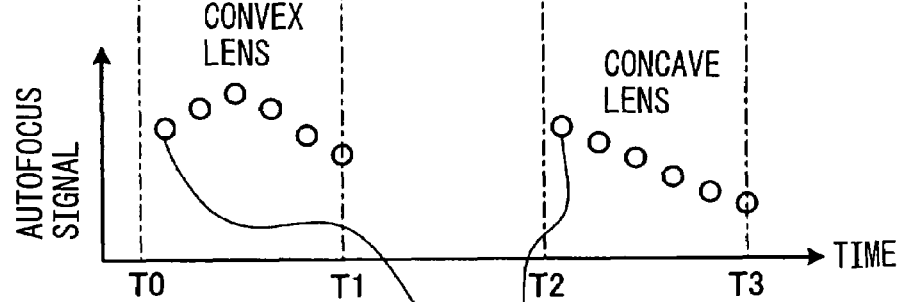
FIG. 10C is a diagram showing autofocus signals when the subject is located at a short distance.

FIG. 10C shows examples of the autofocus signals obtained when the distance L to the object is shorter than 200 mm, for example, when L is 170 mm. Accordingly, the autofocus signal becomes maximum when the liquid crystal lens 7 is functioning as a convex lens. For convenience, the reciprocal of the focal length f is taken, and the value obtained by inverting the sign of the reciprocal, that is, the value −1/f, is used here.

Figure 10D:
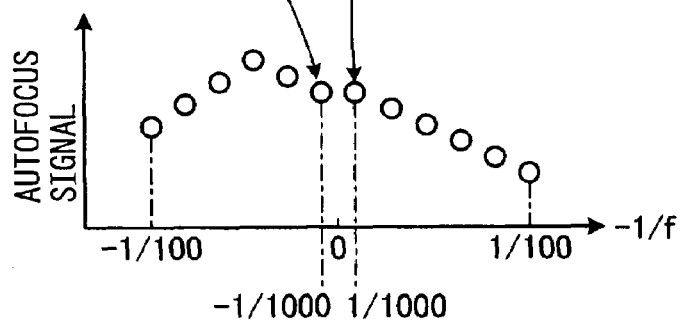
FIG. 10D is a diagram showing the autofocus signals of FIG. 10C arranged in the order of lens powers.

In FIG. 10D, the plurality of autofocus signals obtained by sampling during the transient response of the liquid crystal lens 7 are arranged in increasing order of the value of −1/f, from the most negative value to the most positive value. In the illustrated example, the autofocus controller 5 samples the autofocus signals when the value of −1/f is in the range of −1/100 to 1/100. As can be seen, the autofocus signal becomes maximum when the value of −1/f lies between −1/100 and −1/1000.

Figure 11A:
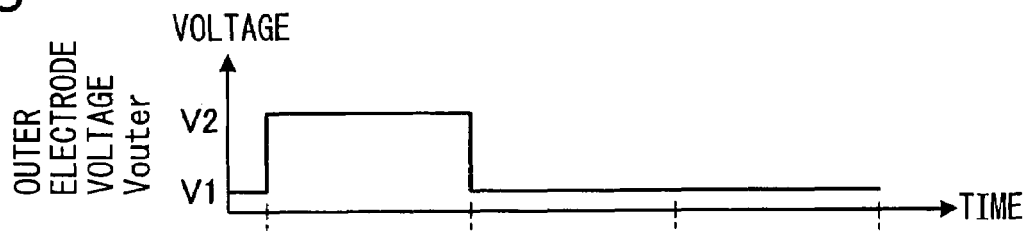
FIG. 11A is a diagram showing one example of the temporal variation pattern of the voltage applied to the outer electrode of the liquid crystal lens shown in FIG. 8A.
Figure 11B:
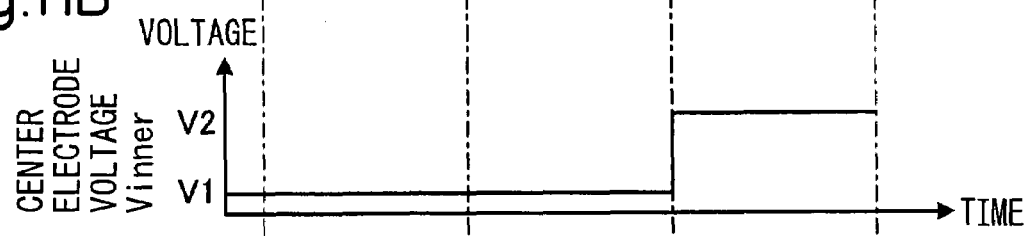
FIG. 11B is a diagram showing one example of the temporal variation pattern of the voltage applied to the center electrode of the liquid crystal lens shown in FIG. 8B.
Figure 11C:
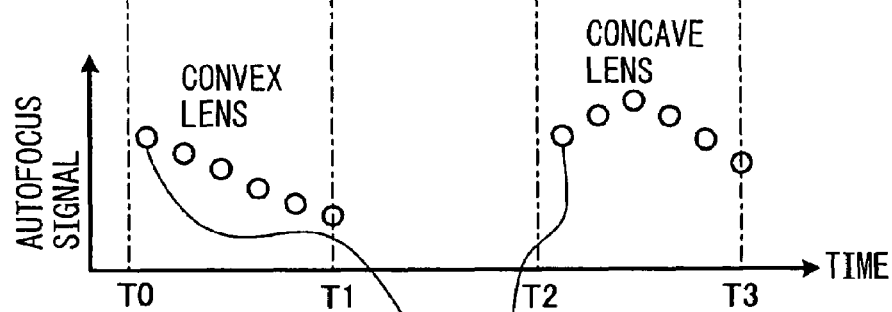
FIG. 11C is a diagram showing autofocus signals when the subject is located at a long distance.
Figure 11D:
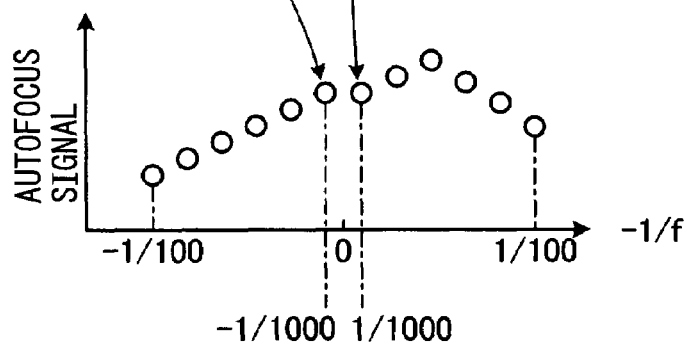
FIG. 11D is a diagram showing the autofocus signals of FIG. 11C arranged in the order of lens powers.

FIG. 11C shows examples of the autofocus signals obtained when the distance L to the object is longer than 200 mm, for example, when L is 350 mm. Accordingly, the autofocus signal becomes maximum when the liquid crystal lens 7 is functioning as a concave lens. In FIG. 11D, the plurality of autofocus signals obtained by sampling during the transient response of the liquid crystal lens 7 are arranged in increasing order of the value of −1/f, from the most negative value to the most positive value.

In this example also, the autofocus controller 5 samples the autofocus signals when the value of −1/f is in the range of −1/100 to 1/100. As can be seen, the autofocus signal becomes maximum when the value of −1/f lies between 1/100 and 1/1000. In either case, after sampling all the autofocus signals, the autofocus controller 5 compares the levels of the autofocus signals and determines the maximum value among them.

The above description also applies to the second voltage application pattern. The basic principle of the contour detection method in which the autofocus signal exhibits a maximum value when the focus is set on the object is disclosed in the above non-patent document 1, and therefore will not be described here.

Next, a description will be given of how control is performed by the autofocus controller 5 to adjust the voltage applied to the liquid crystal lens.

Generally, the transient response period of the liquid crystal lens becomes shorter as the temperature of the liquid crystal lens rises. On the other hand, as previously described, the autofocus signals are acquired by sampling the captured image signal at the frame frequency of the imaging device 3. As a result, the number of autofocus signals acquired within a given period is dependent on the frame frequency. The following description is given by taking as an example the case where the autofocus signals are acquired at a total of 10 focus positions, five during the period from T0 to T1 and the remaining five during the period from T2 to T3, in the first voltage application pattern described above. In the first voltage application pattern, the period from T0 to T1 and the period from T2 to T3 are each a rising response period, that is, the transient response period designated as tf. Accordingly, if it is desired to acquire sampling signals from five focus positions during each transient response period, the relation tf(msec)≧5×(1000/α) must be satisfied, where α is the frame frequency (Hz). This means that, if the frame frequency is 20 Hz, for example, the required number of autofocus signals cannot be acquired unless the rising response time tf of the liquid crystal lens 7 is 250 msec or longer. Here, the frame frequency varies with the exposure time which varies depending on the brightness of the subject whose image is to be captured. For example, when the subject is bright, the frame frequency of the imaging device 3 is increased in order to avoid overexposure. Conversely, when the subject is dark, the frame frequency of the imaging device 3 is reduced in order to avoid underexposure.

Further, as the voltage applied to the liquid crystal lens 7 increases, the transient response period tf during the rising response of the liquid crystal lens 7 and the transient response period tr during the falling response both become shorter. In view of this, the autofocus controller 5 performs control to increase the applied voltage as the temperature of the liquid crystal lens decreases. By controlling the applied voltage in this manner, the autofocus controller 5 can shorten the transient response period and reduce the time required for autofocusing even when the temperature of the liquid crystal lens is low. When the subject is bright, and the frame frequency is therefore high, the autofocus controller 5 further increases the applied voltage since the required number of sampling signals can be acquired in a shorter time. By controlling the applied voltage in this manner, the autofocus controller 5 can further reduce the time required for autofocusing.

For this purpose, a plurality of tables (hereinafter called the voltage tables), each indicating the voltages Vouter and Vinner to be applied to the outer electrode 22 and the center electrode 20, respectively, of the patterned electrode 10 of the liquid crystal lens 7 during the focus signal collective extraction control, are prepared and stored in advance in the storage device 52 provided within the autofocus controller 5. Then, based on the temperature near the liquid crystal lens system 1 and the frame frequency of the imaging device 3, the autofocus controller 5 selects an appropriate one of the voltage tables. For the appropriate voltage table to be selected, each voltage table is stored by being associated with conditions concerning the temperature and the frame frequency for which the voltage table is prepared. More specifically, a lookup table which is referenced to determine the voltage table to be used, for example, based on the temperature and the frame frequency, is prepared and stored in advance in the storage device 52.

The above control will be described in detail with reference to FIGS. 12A to 12E and FIG. 13. FIGS. 12A to 12D show examples of the voltage tables, each indicating the voltages Vouter and Vinner to be applied to the outer electrode 22 and the center electrode 20, respectively, of the patterned electrode 10 of the liquid crystal lens 7 and determined based on the temperature near the liquid crystal lens system 1 and the frame frequency of the imaging device 3. FIG. 12A shows voltage table 1 which is used when the temperature is 20° C. or higher and the frame frequency is lower than 40 Hz. FIG. 12B shows voltage table 2 which is used when the temperature is lower than 20° C. and the frame frequency is lower than 40 Hz. Similarly, FIG. 12C shows voltage table 3 which is used when the temperature is 20° C. or higher and the frame frequency is 40 Hz or higher. Further, FIG. 12D shows voltage table 4 which is used when the temperature is lower than 20° C. and the frame frequency is 40 Hz or higher. In the voltage tables shown in FIGS. 12A to 12D, the initial state, the convex state, the flat state, and the concave state respectively correspond to the state during the period up to time T0, the state during the period from T0 to T1, the state during the period from T1 to T2, and the state during the period from T2 to T3 in the first voltage application pattern.

FIG. 12E shows a lookup table which is used for selecting a voltage table. In FIG. 12E, the leftmost column of the table indicates the temperature range, and the top row of the table shows the frame frequency. The numeric values in the respective table entries indicate the identification numbers assigned to the respective voltage tables.

Figure 13:
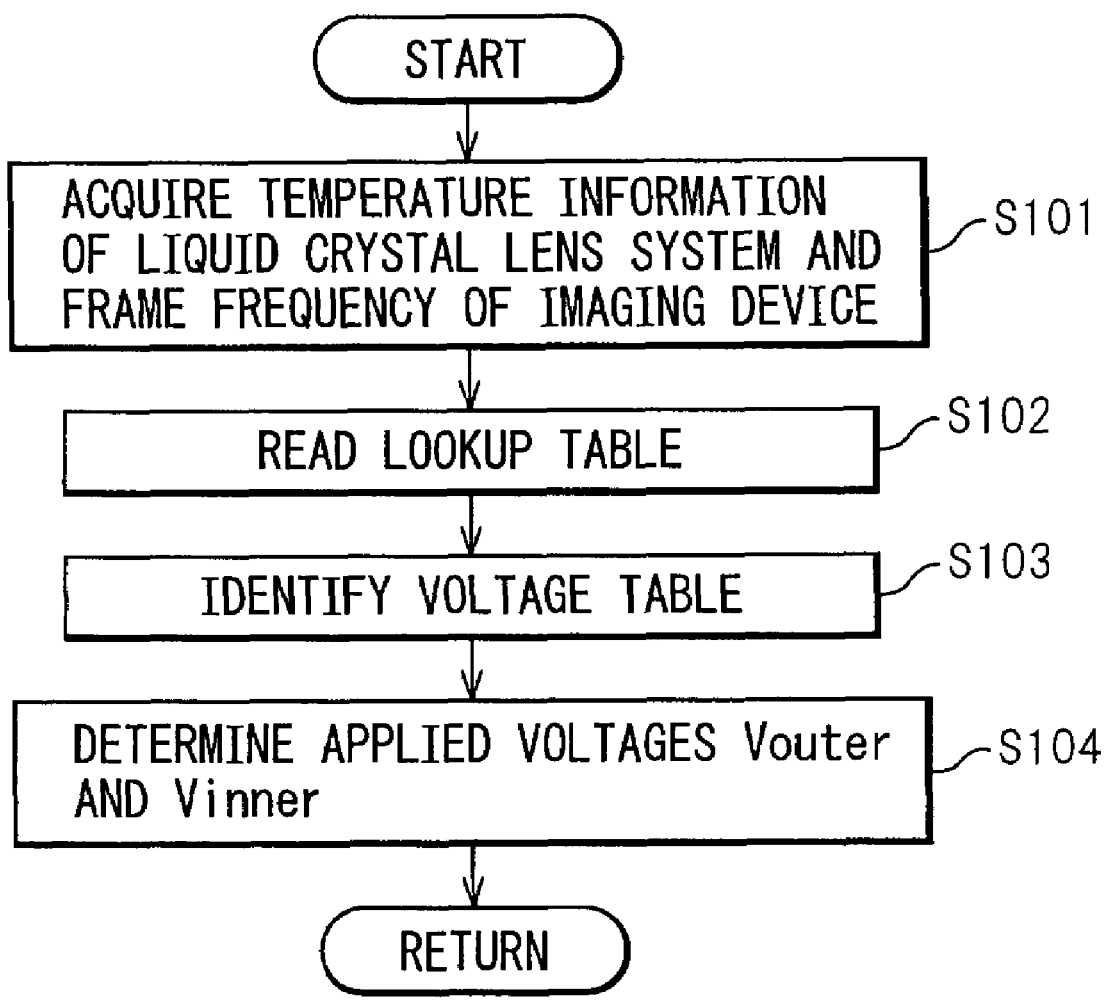
FIG. 13 is a flowchart illustrating the sequence of operations when adjusting the drive voltages applied to the liquid crystal lens.

FIG. 13 is a flowchart illustrating the sequence of control operations that the autofocus controller 5 performs when adjusting the voltage applied to the liquid crystal lens 7.

First, the autofocus controller 5 acquires the temperature near the liquid crystal lens system 1 from the temperature sensor 61 and also acquires the frame frequency of the imaging device 3 (step S101). Next, the autofocus controller 5 reads out the lookup table from the storage device 52 (step S102). Then, by referring to the lookup table, the autofocus controller 5 identifies the voltage table applicable to the acquired temperature and frame frequency (step S103). Upon identifying the voltage table, the autofocus controller 5 reads out the identified voltage table from the storage device 52, and determines the voltages Vouter and Vinner to be applied to the outer electrode 22 and the center electrode 20, respectively, of the patterned electrode 10 of the liquid crystal lens 7 (step S104).

In the above example, four different voltage tables showing the voltages to be applied to the liquid crystal lens 7 have been prepared, but a larger number of voltage tables may be prepared. In particular, noting that the response speed of the liquid crystal lens 7 greatly changes depending on the temperature of the liquid crystal lens system 1 (refer, for example, to FIG. 14), a different voltage table may be constructed for every 5° C. change in the temperature near the liquid crystal lens system 1.

If a cooling device or the like is incorporated in the automatic focusing apparatus of this embodiment, the temperature of the liquid crystal lens system 1 can be maintained substantially constant. In that case, the adjustment of the applied voltages may be made based only on the frame frequency, by assuming that the time required to complete the transient response operation is constant. Similarly, if the apparatus is constructed so that the exposure adjustment of the imaging device 3 is made by only adjusting the diaphragm of the optical lens system 2, the frame frequency is constant. In this case, the adjustment of the applied voltages may be made based only on the temperature by assuming that the frame frequency is fixed.

Generally, the transient response period of the liquid crystal when responding to voltage rising is shorter than the transient response period when responding to voltage falling. Therefore, the autofocus controller 5 may be configured so that when the frame frequency is high, the autofocus signals are acquired by sampling during the transient response of the liquid crystal at the time of voltage rising but, when the frame frequency is low, the autofocus signals are acquired by sampling during the transient response of the liquid crystal at the time of voltage falling.

As described above, according to the present embodiment, when a prescribed voltage is applied to the liquid crystal lens, a plurality of focus signals are sampled during the transient response of the liquid crystal lens operating to respond to the applied voltage, and the maximum value of the focus signal is obtained based on the plurality of focus signals. The focus signal level is the highest when the focus is set on the subject, and decreases as the degree of out-of-focus condition (degree of defocus) increases. Since there is no need to incrementally vary the voltage applied to the liquid crystal and to sample the focus signal after waiting for the response of the liquid crystal to settle each time the voltage is varied, the focused position can be detected in a short time. Furthermore, since the transient response period of the liquid crystal lens is adjusted by adjusting the drive voltage applied to the liquid crystal lens by taking into account the temperature of the liquid crystal lens system and the frame frequency of the imaging device, the time required for autofocusing can be further reduced.

Next, another control method for autofocusing performed by the autofocus controller 5 will be described. In this method, the autofocus controller 5 can also acquire the autofocus signals by focus signal successive extraction control instead of the above-described focus signal collective extraction control. Here, based on the temperature acquired from the temperature sensor 61 and the frame signal, the autofocus controller 5 selects either the focus signal successive extraction control or the focus signal collective extraction control to use when performing autofocusing.

The "focus signal successive extraction control" refers, for example, to a method of control in which the plurality of autofocus signals are extracted by sampling the signal after the liquid crystal in the liquid crystal lens has fully responded to the voltage applied to the liquid crystal lens when the voltage is varied by the liquid crystal lens driver. If the autofocus signals corresponding to the preset number of focus positions are to be acquired by this control, it will require the time equal to the transient response period multiplied by the number of focus positions. A specific method for implementing the focus signal successive extraction control will be described later.

Referring to FIGS. 14 and 15, a description will be given of how the selection is made between the focus signal successive extraction control and the focus signal collective extraction control. FIG. 14 is a table showing response time, processing time for focus signal successive extraction, and number of samplings for focus signal collective extraction control, as compared between various temperatures, when voltage is applied to the liquid crystal. By way of example, the table of FIG. 14 shows the transient response period tf of the liquid crystal when the drive voltage V0 rises from 3 V to 5 V and the transient response period tr of the liquid crystal when the drive voltage V0 falls from 5 V to 3 V.

From the table of FIG. 14, it can be seen that, when the temperature is 40° C., for example, the duration of transient response period tf of the liquid crystal when the drive voltage rises and the duration of the transient response period tr of the liquid crystal when the drive voltage falls are 100 milliseconds and 150 milliseconds, respectively, and when the temperature is 20° C., the duration of the transient response period tf of the liquid crystal when the drive voltage rises and the duration of the transient response period tr of the liquid crystal when the drive voltage falls are 250 milliseconds and 375 milliseconds, respectively.

Suppose here that the focal length of the liquid crystal lens system 1 is changed to one of 10 preset positions in order to focus the image of the subject onto the imaging device 3 through the optical system of the present embodiment which includes the liquid crystal lens system 1 and the optical lens system 2. In FIG. 14, the successive extraction processing time is the processing time required when 10 preset focus positions are provided to cover the range from near to far, and the number of samplings (at 20 Hz) during the period tf for collective extraction is the number of samplings taken during the transient response of the liquid crystal when the autofocus signal is sampled at the frame frequency of 20 Hz, that is, at intervals of 50 milliseconds. The number of samplings (at 40 Hz) during the period tf for collective extraction is the number of samplings taken during the transient response of the liquid crystal when the autofocus signal is sampled at the frame frequency of 40 Hz, that is, at intervals of 25 milliseconds. Here, the number of samplings for collective extraction is the number of samplings taken while the power of the liquid crystal lens 7 is being varied over the entire preset range from negative to positive regions. Accordingly, the number of samplings is computed based on the time required for at least two transient response operations.

As can be seen from the successive extraction processing time shown in FIG. 14, when the focus signal successive extraction control is performed at temperatures lower than 15° C., an autofocusing time longer than 3 seconds becomes necessary, which renders the focus signal successive extraction control impractical. On the other hand, when the subject is relatively dark, at temperatures higher than 20° C. the number of samplings that can be taken during the transient response is smaller than the number of focus positions preset to cover the range from near to far, as can be seen from the number of samplings for collective extraction 1 shown in FIG. 14. Accordingly, with the focus signal collective extraction control, it is not possible to acquire the autofocus signals corresponding to all the focus positions, resulting in an inability to determine the correct focus position. However, when the subject is relatively bright, if the temperature is 30° C. or lower, then the autofocus signals corresponding to all the 10 focus positions preset to cover the range from near to far can be acquired by the focus signal collective extraction control, as can be seen from the number of samplings for collective extraction 2 shown in FIG. 14.

In view of the above, based on the temperature obtained from the temperature sensor 61, the autofocus controller 5 computes the duration of the transient response period of the liquid crystal lens 7 contained in the liquid crystal lens system 1 and, based on the transient response period and the frame frequency, computes the number of samplings that can be taken when the collective extraction control is performed. Then, the autofocus controller 5 performs the collective extraction control if the number of samplings is not smaller than the number of preset focus positions; otherwise, the successive extraction control is performed. As can be seen from FIG. 14, when the temperature is 20° C., for example, the time required to acquire the auto focus signals in the collective extraction control is 250 milliseconds from time T0 to T1, 375 milliseconds from time T1 to T2, and 250 milliseconds from time T2 to T3, a total of 875 milliseconds.

Next, the autofocusing process performed by the autofocus controller 5 will be described with reference to the flowchart of FIG. 15. FIG. 15 is the flowchart illustrating the sequence of autofocusing operations performed by the automatic focusing apparatus according to the first embodiment.

When the autofocusing process is started, first the temperature near the liquid crystal lens system 1 is detected by the temperature sensor 61 shown in FIG. 1 (step S201).

Next, based on the detected temperature, the autofocus controller 5 retrieves from the storage device 52 the table showing the relationship between the temperature and the transient response period of the liquid crystal lens 7, and computes the duration of the transient response period of the liquid crystal lens 7 (step S202). Then, based on the response time of the liquid crystal lens 7 and the frame frequency, the autofocus controller 5 computes the number of samplings of the autofocus signals that can be taken while the focal length of the liquid crystal lens 7 is being varied over the entire preset range (step S203). The autofocus controller 5 then compares the thus computed number of samplings with the number of preset focus positions (step S204). If the computed number of samplings is equal to or larger than the number of preset focus positions (Yes in step S204), the autofocus controller 5 selects the focus signal collective extraction control (step S205).

On the other hand, if, in step S204, the computed number of samplings is smaller than the number of preset focus positions (No in step S204), the autofocus controller 5 selects the focus signal successive extraction control (step S206).

In this way, by selecting either the focus signal successive extraction control or the focus signal collective extraction control based on the temperature near the liquid crystal lens system 1 and the frame frequency of the imaging device 3, correct focusing can be achieved while minimizing the time required for autofocusing.

When making a selection between the focus signal successive extraction control and the focus signal collective extraction control, the autofocus controller 5 may adjust the applied voltage as earlier described. In this case, under specific conditions where the required number of samplings cannot be obtained even if the applied voltage is adjusted, the autofocus controller 5 performs the focus signal successive extraction control; otherwise, the focus signal collective extraction control is performed. To enable such a selection, a lookup table (hereinafter called the integrated lookup table) similar to the earlier described voltage table selection lookup table is prepared by embedding a code indicating the focus signal successive extraction control instead of the voltage table identification number in the position corresponding to the specific conditions. Then, in a manner similar to the earlier described procedure of FIG. 13, the autofocus controller 5 can determine whether to perform the focus signal successive extraction control or the focus signal collective extraction control, by referring to the integrated lookup table based on the acquired temperature and frame frequency. When selecting the focus signal collective extraction control, the autofocus controller 5 can also determine the voltage to be applied to the liquid crystal lens.

Figure 16A:
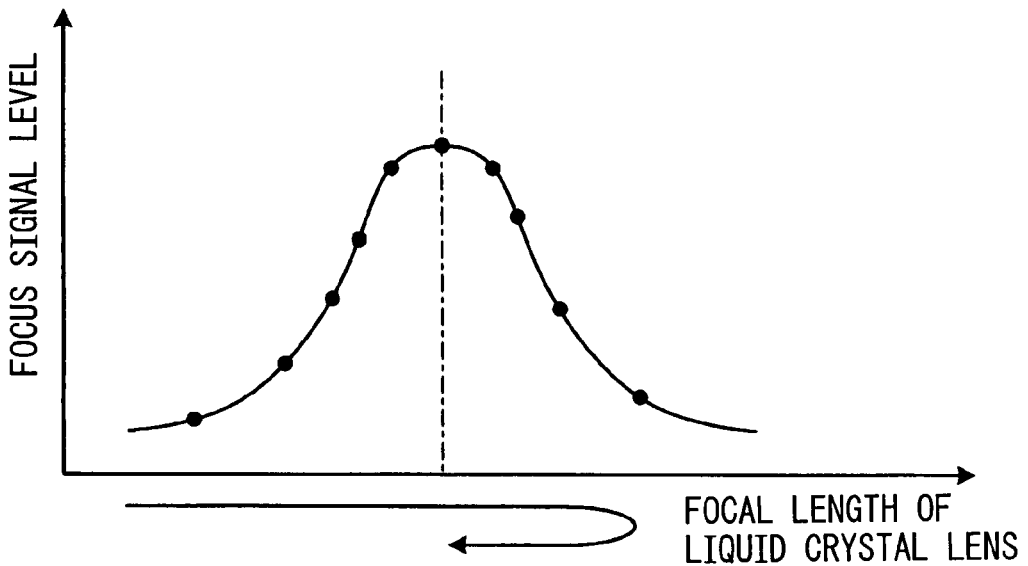
FIG. 16A is a diagram schematically showing the operation of focus signal successive extraction control based on a scan method.
Figure 16B:
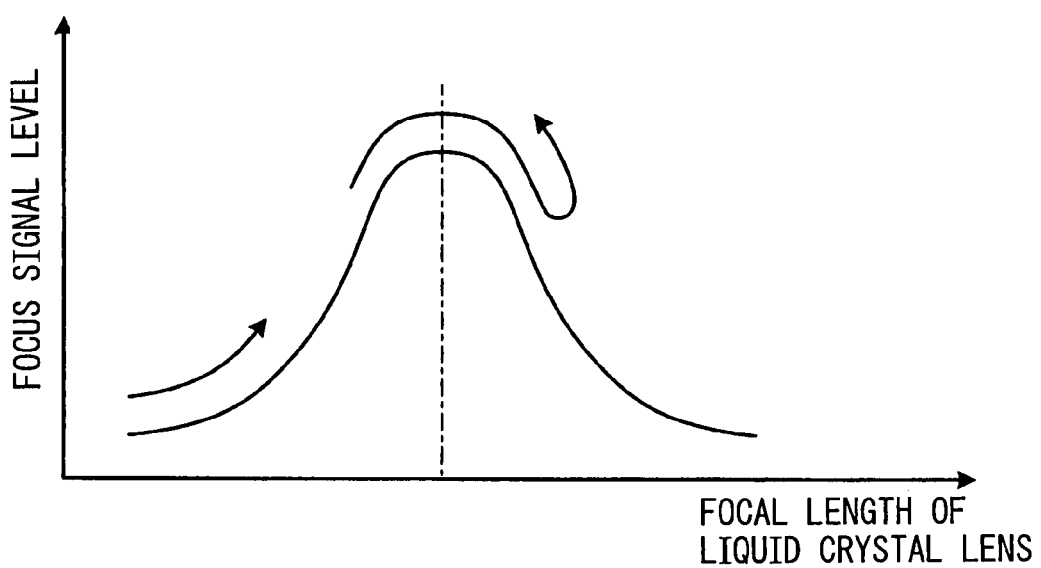
FIG. 16B is a diagram schematically showing the operation of focus signal successive extraction control based on a hill climbing method.

Next, the focus signal successive extraction control will be described. FIGS. 16A and 16B are diagrams schematically showing focus signal successive extraction control operations performed using a scan method and a hill climbing method, respectively. In FIGS. 16A and 16B, the abscissa represents the focal length of the liquid crystal lens 7, and the ordinate represents the autofocus signal.

In the scan method shown in FIG. 16A, the autofocus controller 5 applies a drive voltage corresponding to a given position to the liquid crystal lens 7 through the liquid crystal lens driver 6, and acquires the autofocus signal at the end of the transient response period defined in FIG. 14. After that, the autofocus controller 5 applies a drive voltage corresponding to the next position to the liquid crystal lens 7, and acquires the autofocus signal at the end of the transient response period defined in FIG. 14. By repeating such operations, the autofocus controller 5 obtains the all autofocus signals for entire the focusing range. From among the thus obtained autofocus signals, the autofocus controller 5 obtains the maximum value of the autofocus signal, and applies the drive voltage corresponding to the maximum value to the liquid crystal lens 7 to achieve focusing.

On the other hand, in the hill climbing method shown in FIG. 16B, the autofocus controller 5 compares the currently acquired autofocus signal with the immediately previous autofocus signal to check whether the signal improves, and searches for the maximum value by iteratively repeating this operation.

Either the scan method or the hill climbing method may be used in the focus signal successive extraction control, but the following description is given based on the scan method.

Figure 17A:
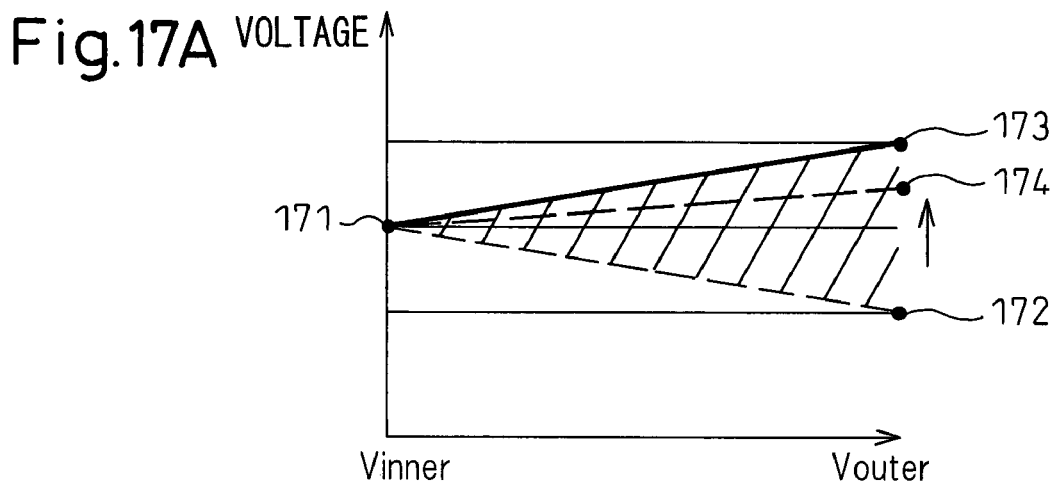
FIG. 17A is a diagram showing one example of how the voltage applied to the liquid crystal lens is varied during the focus signal successive extraction, based on the focus signal successive extraction control.
Figure 17B:
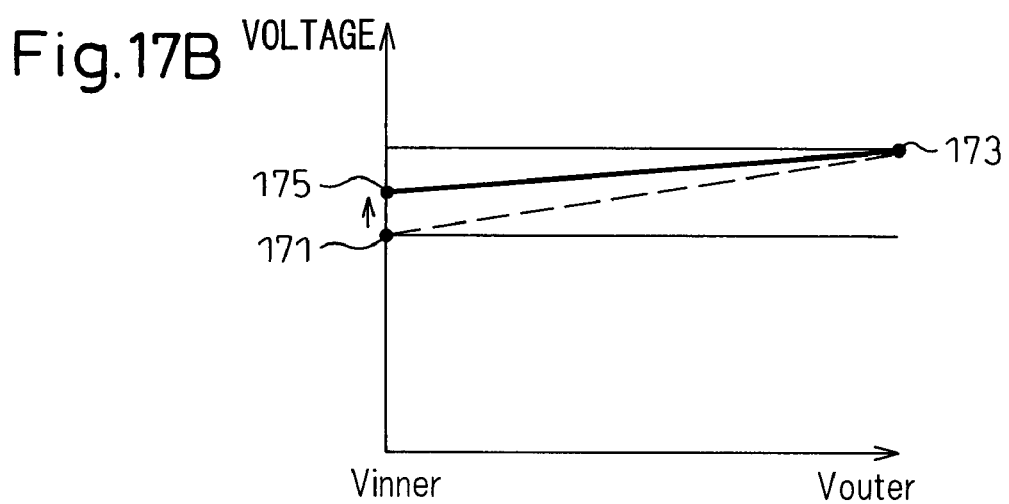
FIG. 17B is a diagram showing one example of how the voltage applied to the liquid crystal lens is varied for focusing, based on the focus signal successive extraction control.
Figure 17C:
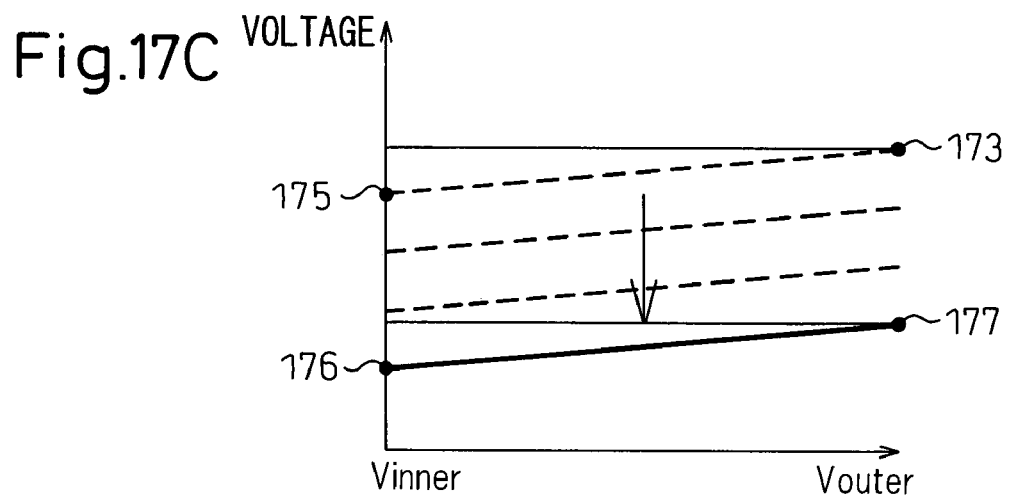
FIG. 17C is a diagram showing one example of how the voltage applied to the liquid crystal lens is varied after achieving focusing, based on the focus signal successive extraction control.

The method of voltage application to the liquid crystal lens 7 performed in the focus signal successive extraction control will be described with reference to FIGS. 17A to 17C and FIGS. 18A and 18B. FIG. 17A shows how the applied voltage is varied during the focus signal successive extraction. FIG. 17B shows how the applied voltage is varied for achieving focusing. FIG. 17C shows how the applied voltage is varied after achieving focusing. In each figure, the ordinate represents the applied voltage. The voltage Vinner to the center electrode 20 is shown at the leftmost end of each figure, and the voltage Vouter to the outer electrode 22 is shown at the rightmost end. The voltages applied to the respective ring electrodes 21 are schematically shown between the leftmost and rightmost ends, the voltages nearer to the rightmost end being the voltages applied to the ring electrodes nearer to the outer electrode 22.

As shown in FIG. 17A, first the autofocus controller 5 fixes the voltage Vinner applied to the center electrode 20 of the patterned electrode 10 to a value at point 171. Then, the autofocus controller 5 varies the applied voltage in such a manner as to cause the liquid crystal lens 7 to perform only the rising response operation. That is, the autofocus controller 5 incrementally raises only the voltage applied to the outer electrode 22, in such a manner as to cause the applied voltage Vouter to the outer electrode 22 to change from the value at point 172 up to the value at point 173 as shown in the figure.

FIG. 18A shows specific examples of the applied voltages when the control shown in FIG. 17A is performed. That is, FIG. 18A shows the voltages to be applied to the center electrode 20 and outer electrode 22 of the liquid crystal lens 7 at various focus positions when the focus positions of the optical system comprising the liquid crystal lens system 1 and optical lens system 2 are set at 10 positions covering the range from infinity to the nearest shooting distance. In the illustrated example, the voltage Vinner applied to the center electrode 20 is fixed to 5.5 V. Then, the autofocus controller 5 causes the voltage Vouter to the outer electrode 22 to change incrementally from 3.5 V at which the negative power is maximum (lens level 9) up to 7.5 V at which the positive power is maximum (lens level 0), thereby causing the focal length of the liquid crystal lens 7 to change from concave to convex in such a manner that the focusing position of the optical system, initially set at infinity, gradually comes closer to the nearest position. Here, for the sake of convenience, the lens level i (i=0, 1, 2, ..., 9) represents the focal length of the liquid crystal lens system 1 corresponding to each focus position.

When the autofocus signals for all the positions are acquired, the autofocus controller 5 obtains the lens level that maximizes the autofocus signal. Then, for focusing, the autofocus controller 5 applies the voltage to the liquid crystal lens 7 through the liquid crystal lens driver 6 so as to achieve the lens level that maximizes the autofocus signal.

At this time, the autofocus controller 5 adjusts the voltage applied to the electrode whose applied voltage has been held fixed when acquiring the autofocus signal. For example, suppose that when the applied voltage to the outer electrode 22 is set to point 174 in FIG. 17A, the autofocus signal becomes maximum (the lens level at this time is denoted as Lmax). Then, the autofocus controller 5 fixes the applied voltage to the outer electrode 22 to point 173, and raises the voltage applied to the center electrode 20, as shown in FIG. 17B. Its applied voltage Vinner is then set to point 175 where the lens level of the liquid crystal lens 7 becomes Lmax. By adjusting the voltage in this manner, since the focusing can be achieved by using only the rising response of the liquid crystal, autofocusing can be accomplished in a shorter time. Here, if it can be determined that the autofocus signal is maximum at point 174 in FIG. 17A, the autofocus controller 5 need not necessarily scan the voltage incrementally up to point 173, but may shift Vouter to point 173 when it can be determined that the autofocus signal has reached the maximum value. By performing control in this manner, the time required for autofocus control can be further shortened.

In the above autofocusing process, when a plurality of autofocusing operations are performed in succession, the voltage applied to the liquid crystal lens 7 gradually rises. Accordingly, the liquid crystal lens driver 6 must be designed to be able to drive the liquid crystal lens 7 over a wide voltage range. Further, the autofocus controller 5 must lower the voltage applied to the electrode whose applied voltage is not fixed, in order to vary the power of the liquid crystal lens 7 from the maximum positive set value to the maximum negative set value or from the maximum negative set value to the maximum positive set value each time the autofocusing is performed, and much time is thus spent before starting the acquisition of the autofocus signal.

In view of the above, once the autofocusing is done, the autofocus controller 5 lowers the applied voltages Vinner and Vouter of the center electrode 20 and outer electrode 22 to the standby reference voltages during a period unrelated to the autofocusing, while holding the lens level of the liquid crystal lens 7 at the level where the focusing was achieved. Here, the period unrelated to the autofocusing is, for example, the period during which the captured image is being written to the image memory (not shown) immediately after the shutter release was depressed. By lowering the applied voltages during the writing of the captured image, the out-of-focus condition occurring during the transient response due to the decreased voltage can be made invisible to the user in the case of a camera that displays the captured image in the viewfinder during the writing of the captured image. Alternatively, the autofocus controller 5 may lower the applied voltages Vinner and Vouter to the reference voltages progressively in three steps. By performing control in this manner, the voltage applied to the liquid crystal lens 7 can be lowered without the user being aware of the out-of-focus condition even in the case of a camera that displays the latest image in the viewfinder during the writing of the captured image, because the variation during the transient response in each step is small.

FIG. 18B shows one example of a table that shows the relationship between the lens level and the reference voltages applied to the center electrode 20 and outer electrode 22 during standby. This table is constructed in advance and stored in the storage device 52 provided within the autofocus controller 5. The table is used when acquiring the standby reference voltages.

As shown in FIG. 17C, based on the lens level Lmax when the focusing is achieved, the autofocus controller 5 refers to the table shown in FIG. 18B and acquires the applied voltages Vinner and Vouter corresponding to points 176 and 177 that should be applied to the center electrode 20 and outer electrode 22 so that the lens level can be maintained at Lmax. Then, the autofocus controller 5 controls the liquid crystal lens driver 6 to lower the applied voltages of the liquid crystal lens 7 down to the acquired voltage levels.

After the liquid crystal lens 7 is placed in the standby mode, if it is desired to perform the autofocusing once again, the autofocus controller 5 raises the voltage applied to the center electrode 20 until the lens level 9 (the negative maximum power of the liquid crystal lens 7) is achieved. After that, the above autofocusing process is repeated.

As described above, by performing the focus signal successive extraction control using only the rising response, the time required for autofocusing can be reduced.

Further, since the liquid crystal lens driver 6 is controlled to lower the applied voltages of the liquid crystal lens during the period unrelated to the autofocusing, the liquid crystal lens driver 6 need not have a wide drive voltage range, and the time required for autofocusing can be prevented from increasing.

Here, the autofocus controller 5 may determine which of the applied voltages, the voltage to the center electrode 20 or the voltage to the outer electrode 22, is to be fixed, by referring to the voltage application condition of the liquid crystal lens 7 immediately before starting the autofocusing process. In this case, the autofocus controller 5 fixes the higher applied voltage as the reference voltage, because then the time required to achieve the initial state for starting the autofocusing process can be reduced. For example, when the state of the liquid crystal lens 7 immediately before starting the autofocusing process is a concave lens, since the voltage applied to the center electrode 20 is higher than the voltage applied to the outer electrode 22, the autofocus controller 5 fixes the voltage applied to the center electrode 20 as the reference voltage. Conversely, when the state of the liquid crystal lens 7 immediately before starting the autofocusing process is a convex lens, since the voltage applied to the outer electrode 22 is higher than the voltage applied to the center electrode 20, the autofocus controller 5 fixes the voltage applied to the outer electrode 20 as the reference voltage.

Further, when performing focusing operations using the successive extraction control, the autofocus controller 5 may adjust the voltage applied to the liquid crystal lens 7 based on the temperature of the liquid crystal lens system 1, etc. in the same manner as when performing the collective extraction control.

The autofocus controller 5 may also be configured to perform the collective extraction control using only the rising response, as in the successive extraction described above. In this case, the autofocus controller 5 fixes, for example, the voltage applied to the center electrode 20, and sets the voltage applied to the outer electrode 22 so that the lens level of the liquid crystal lens 7 becomes 9 (the condition in which the power of the liquid crystal lens 7 reaches the negative maximum value). After that, the autofocus controller 5 raises the voltage applied to the outer electrode 22 up to the value that achieves the lens level 0 of the liquid crystal lens 7 (the condition in which the power of the liquid crystal lens 7 reaches the positive maximum value). Then, the autofocus signals are sequentially acquired during the transient response of the liquid crystal lens 7.

Embodiment 2

Figure 19:
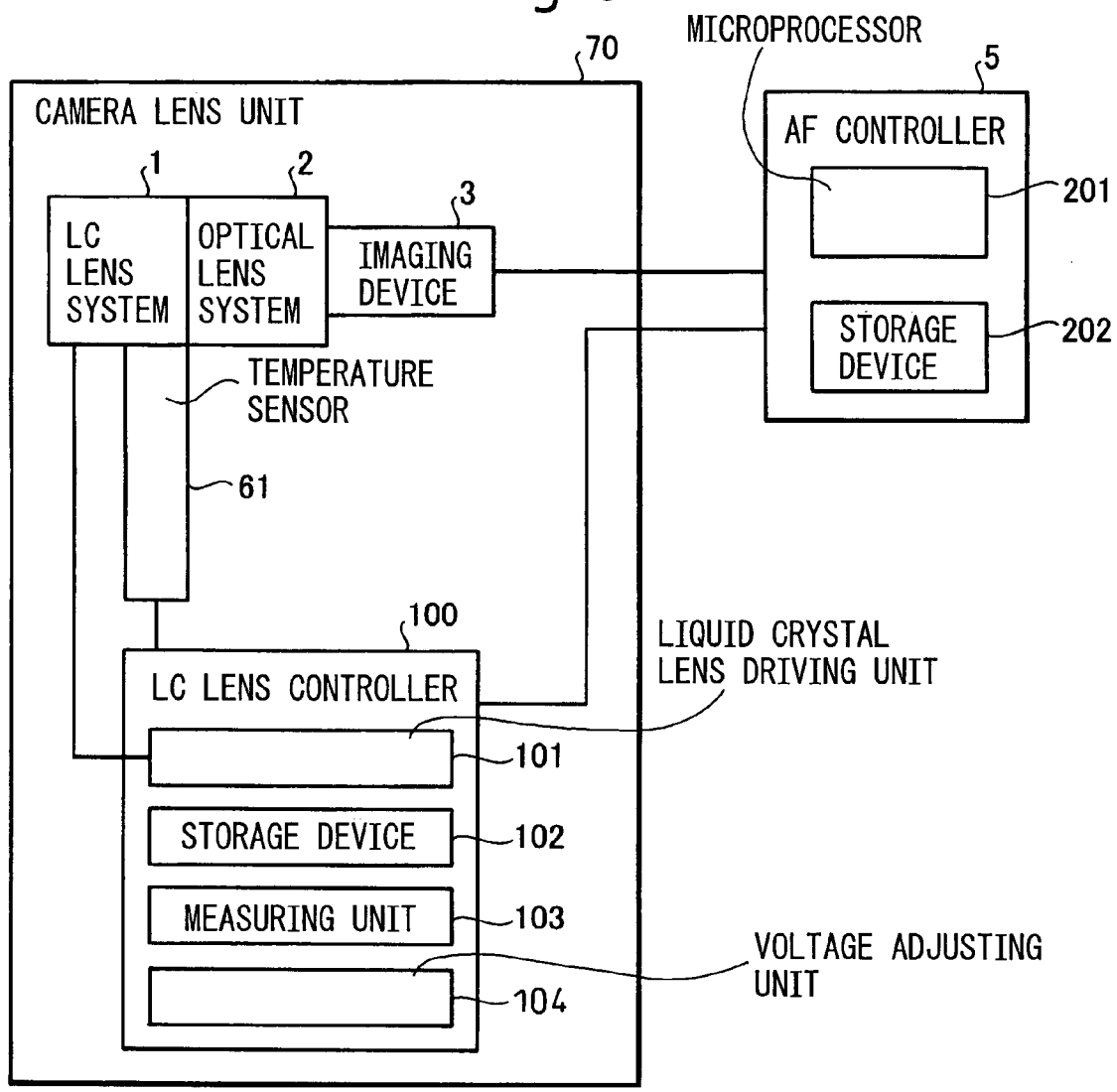
FIG. 19 is a block diagram showing an automatic focusing apparatus according to a second embodiment.

FIG. 19 is a block diagram showing the basic configuration of an automatic focusing apparatus according to the present invention. As shown in FIG. 19, the automatic focusing apparatus according to the present invention comprises a camera lens unit 70 and an autofocus controller 5. The camera lens unit 70 comprises a liquid crystal lens system 1, an optical lens system 2, an imaging device 3, a liquid crystal (LC) lens controller 100, and a temperature sensor 61. The liquid crystal lens system 1 is constructed by combining a liquid crystal lens for P waves with a liquid crystal lens for S waves. The optical lens system 2 comprises a diaphragm, a group of lenses, and an infrared cutoff filter, through which an image of an object located at a prescribed distance from the optical lens system 2 is focused onto the imaging device 3. The imaging device 3 comprises an image sensor constructed from a solid-state imaging device, such as a CCD or CMOS imager, and an analog-digital converter. The temperature sensor 61 is mounted near the liquid crystal lens system 1, and is used to estimate the temperature of the liquid crystal lens system 1 by measuring the temperature near the liquid crystal lens system 1.

The optical image focused through the liquid crystal lens system 1 and the optical lens system 2 is converted into an electrical signal by the image sensor in the imaging device 3. The electrical signal output from the image sensor is converted into a digital signal by the analog-digital converter. The autofocus controller 5 samples the digital signal output from the analog-digital converter at a prescribed frequency, and obtains a focus signal (hereinafter called the autofocus signal) by extracting a high-frequency component from an image captured of a specific area. Based on a plurality of autofocus signals thus obtained, the autofocus controller 5 determines the focus position at which the autofocus signal level becomes maximum, and sets the liquid crystal lens controller 100 so as to achieve the lens level that maximizes the autofocus signal level. Here, for the sake of convenience, the lens level represents the focal length of the liquid crystal lens system 1 corresponding to each focus position, as previously described with reference to the focus signal successive extraction control.

The autofocus controller 5 includes a microprocessor 201 which performs the above sequence of control operations and a (second) storage device 202. The (second) storage device 202 includes a read-only memory area (ROM area) which stores programs to be executed by the microprocessor 201 and a writable memory area (RAM area) which the microprocessor 201 uses as a work area.

The liquid crystal lens controller 100 comprises a liquid crystal lens driving unit 101, a (first) storage device 102, a measuring unit 103, and a voltage adjusting unit 104. When an autofocus start request is received from the autofocus controller 5, the liquid crystal lens controller 100 measures the time elapsed from the start of the transient response by means of the measuring unit 103. The time elapsed from the start of the transient response and the lens level corresponding to that time are prestored in the (first) storage device 102 for each associated temperature. The liquid crystal lens driving unit 101 applies a voltage to the liquid crystal lens system 1 during the transient response in accordance with a driving method to be described later. The voltage adjusting unit 104 adjusts the voltage applied to the liquid crystal lens system 1 by referring to the temperature near the liquid crystal lens system 1 and the frame frequency (or image signal acquisition period) of the imaging device 3.

The imaging device 3 corresponds to an optical-to-electrical converter. The autofocus controller 5 corresponds to a focus signal extraction unit and second storage device, and extracts focus signals in a collective manner. The liquid crystal lens controller 100 corresponds to a control unit, liquid crystal lens driving unit, first storage device, and measuring device.

Since the liquid crystal lens controller 100 in the camera lens unit 70 holds the lens level corresponding to the time elapsed from the start of the transient response, as described above, the autofocus controller 5 can acquire the lens level correctly, without having to consider the characteristics of the liquid crystal panel or variations thereof.

The configuration of the liquid crystal lens system 1 in the automatic focusing apparatus according to the second embodiment is the same as that in the automatic focusing apparatus according to the first embodiment shown in FIGS. 2 and 3, and therefore, will not be further described here. Further, in the automatic focusing apparatus according to the second embodiment, the structure of the patterned electrode 10 of the liquid crystal lens 7 and the operation of the liquid crystal lens 7 are the same as those in the automatic focusing apparatus according to the first embodiment shown in FIG. 4, and therefore, will not be further described here. The way that the refractive index changes when a voltage is applied to the liquid crystal while light whose plane of polarization coincides with the orientation direction of the liquid crystal is passing through the liquid crystal is also the same as that in the automatic focusing apparatus according to the first embodiment shown in FIGS. 5A and 5B, and therefore, will not be further described here. Further, the way that the refractive index of the liquid crystal and the focal length of the liquid crystal lens 7 change during the transient response period tf at the rising of the drive voltage is also the same as that in the automatic focusing apparatus according to the first embodiment shown in FIGS. 6A and 6B, and therefore, will not be further described here. Furthermore, the adjustment of the voltages applied to the liquid crystal lens is the same as that performed in the voltage adjusting control according to the first embodiment, and therefore, will not be further described here.

Figure 20A:
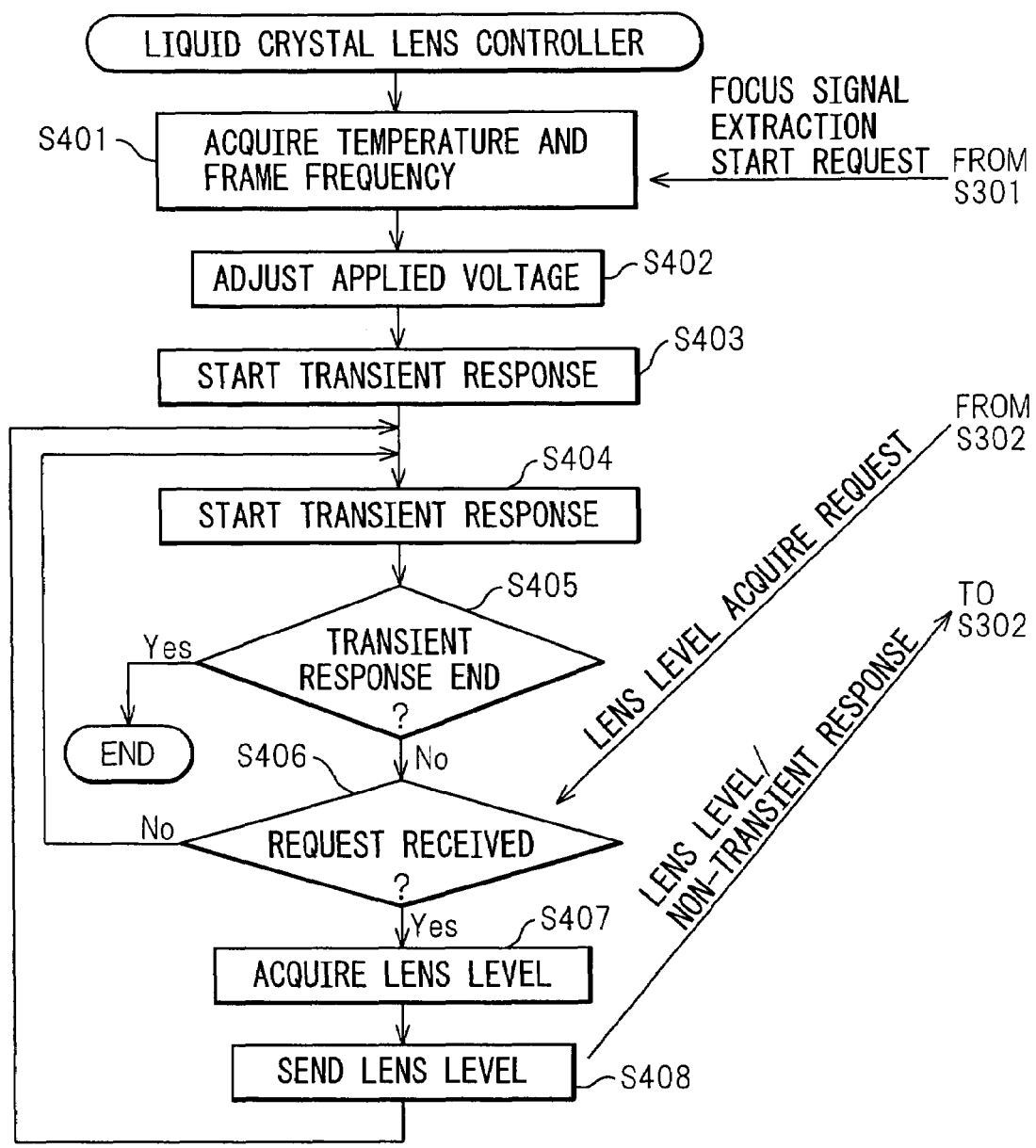
FIG. 20A is a flowchart illustrating the autofocus operation of a liquid crystal lens controller according to the second embodiment.

Next, the automatic focusing process that the autofocus controller 5 performs in conduction with the liquid crystal lens controller 100 will be described with reference to the flowcharts of FIGS. 20A and 20B. FIG. 20A is the flowchart illustrating the autofocus operation of the liquid crystal lens controller according to the second embodiment, and FIG. 20B is the flowchart illustrating the autofocus operation of the autofocus controller according to the second embodiment.

Figure 20B:
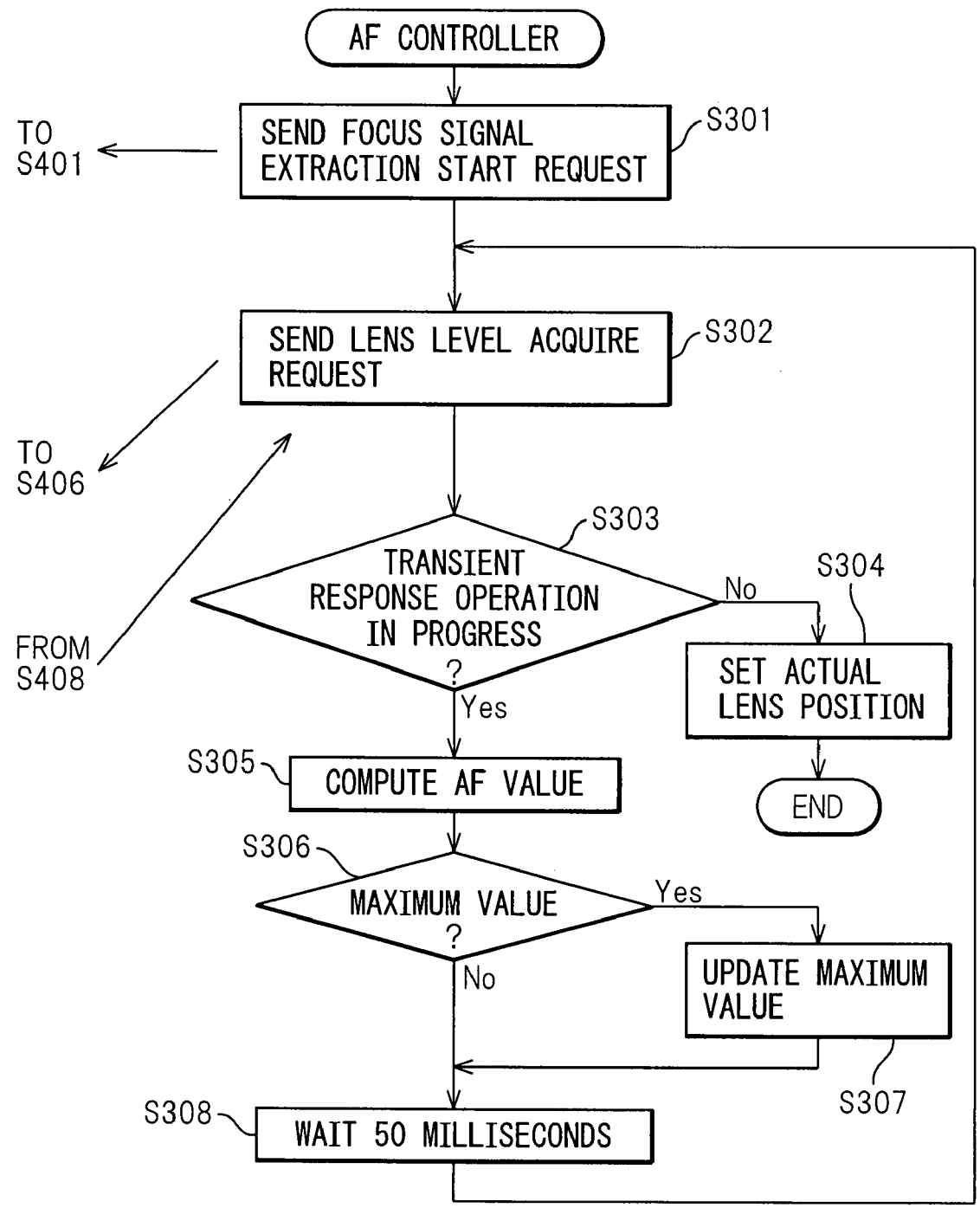
FIG. 20B is a flowchart illustrating the autofocus operation of an autofocus controller according to the second embodiment.

As shown in FIG. 20B, when the autofocus process is started, first the autofocus controller 5 sends a focus signal extraction start request to the liquid crystal lens controller 100 (step S301). Then, in step S302, the autofocus controller 5 sends a lens level acquire request to the liquid crystal lens controller 100 (step S302).

On the other hand, as shown in FIG. 20A, when the focus signal extraction start request is received from the autofocus controller 5, the liquid crystal lens controller 100 acquires the temperature near the liquid crystal lens system 1 from the temperature sensor 61. Further, the liquid crystal lens controller 100 acquires the frame frequency of the imaging device 3 from the autofocus controller 5 (step S401). Then, the liquid crystal lens controller 100 adjusts the voltage applied to the liquid crystal lens system 1 in accordance with the earlier described voltage adjusting control (step S402). The liquid crystal lens controller 100 receives the frame frequency of the imaging device 3 from the autofocus controller 5. Then, using the earlier described voltage application method, the liquid crystal lens controller 100 causes the liquid crystal lens 7 to start a transient response operation (step S403). When the transient response is started, the measuring unit 103 starts to measure the elapsed time from the start of the transient response (step S404).

Then, the liquid crystal lens controller 100 compares the elapsed time measured by the measuring unit 103 with the transient response end time prestored in the (first) storage device 102 (step S405), and if the transient response end time is past (Yes in step S405), the transient response operation is terminated.

On the other hand, if, in step S405, the transient response end time is not past yet (No in step S405), the liquid crystal lens controller 100 checks whether the lens level acquire request from the autofocus controller 5 has been received or not (step S406). If the lens level acquire request is not yet received from the autofocus controller 5 (No in step S406), the liquid crystal lens controller 100 returns control to step S404, and repeats steps S405 and S406.

If the lens level acquire request is received from the autofocus controller 5 in step 406 (Yes in step S406), then based on the acquired temperature near the liquid crystal lens system 1, the liquid crystal lens controller 100 acquires the lens level corresponding to the time elapsed from the start of the transient response by referring to the lens level table stored in the (first) storage device 102 for each associated temperature (step S407), and sends the lens level to the autofocus controller 5 (step S408). If the transient response operation is already terminated, then instead of the lens level, the liquid crystal lens controller 100 sends, for example, a negative numerical value to the autofocus controller 5 as a lens level that the transient response operation presents.

On the other hand, as shown in FIG. 20B, when the lens level is received from the liquid crystal lens controller 100, the autofocus controller 5 checks whether the transient response operation is in progress or not (step S303). If the transient response operation is in progress, the autofocus controller 5 computes the autofocus (AF) value (step S305), and checks whether it is the largest autofocus value of all the values obtained since the start of the transient response (step S306). If it is the largest autofocus value (Yes in step S306), the autofocus controller 5 stores that autofocus value and the lens level in the (second) storage device 202 in the autofocus controller 5 (to update the stored contents) (step S307). On the other hand, if it is not the largest autofocus value (No in step S306), the autofocus controller 5 does nothing and transfers control to step S308.

Then, after waiting, for example, for 50 milliseconds which equals to the frame time (step S308), the autofocus controller 5 returns control to step S302, and repeats the above process until the transient response operation is completed. If, in step S303, the transient response operation is already completed (No in step S303), the autofocus controller 5 sets the liquid crystal lens controller 100 so as to achieve the lens level corresponding to the largest autofocus value stored in the (second) storage device 202 (step S304), and terminates the sequence of operations.

The lens level table stored in the first storage device 102 in step S407 will be described below. FIG. 21 shows one example of the table that provides the mapping between the time elapsed from the start of the transient response and the lens level.

The lens level table of FIG. 21 stored in the (first) storage device 102 shows the relationship between the time elapsed from the start of the transient response and the lens level for each predetermined temperature condition (in the illustrated example, temperature conditions 1 to 4 are shown). The data carried in this table is based on the actual optical characteristics of the liquid crystal lens 7. The elapsed time versus lens level table is provided, for example, for every 5° C. or 10° C. change in temperature. This table should also be set based on the optical characteristics.

For example, in temperature condition 1, when the time elapsed from the start of the transient response is less than 150 milliseconds, the liquid crystal lens controller 100 sends lens level "0" to the autofocus controller 5. Likewise, the liquid crystal lens controller 100 sends lens level "1" to the autofocus controller 5 when the elapsed time is 150 milliseconds or longer, but not longer than 250 milliseconds, sends lens level "2" when the elapsed time is 250 milliseconds or longer, but not longer than 330 milliseconds, sends lens level "3" when the elapsed time is 330 milliseconds or longer, but not longer than 450 milliseconds, sends lens level "4" when the elapsed time is 450 milliseconds or longer, but not longer than 600 milliseconds, sends lens level "5" when the elapsed time is 600 milliseconds or longer, but not longer than 680 milliseconds, sends lens level "6" when the elapsed time is 680 milliseconds or longer, but not longer than 780 milliseconds, sends lens level "7" when the elapsed time is 780 milliseconds or longer, but not longer than 900 milliseconds, sends lens level "8" when the elapsed time is 900 milliseconds or longer, but not longer than 1000 milliseconds, and sends a "negative number" as the lens level when the elapsed time is 1000 milliseconds or longer.

In the other temperature conditions 2 to 4 also, the liquid crystal lens controller 100 operates based on the data shown in the table of FIG. 21. The data shown here are only examples, and it will be appreciated that if five or more sets of temperature information are provided, the lens level can be controlled with higher accuracy.

As described above, according to the second embodiment, by collectively extracting the plurality of focus signals corresponding to various focusing states during the transient response of the liquid crystal lens, the focused position can be detected at a sufficiently high speed that suffices for practical purposes. Furthermore, since provisions are made to hold the lens level corresponding to the time elapsed from the start of the transient response in the liquid crystal lens controller 100 provided within the camera lens unit 70, the autofocus controller 5 can be designed and fabricated as an independent module without having to consider the characteristics of the liquid crystal lens.

In the second embodiment, as in the first embodiment, provisions may be made to choose between the focus signal collective extraction control and the focus signal successive extraction control based on the temperature near the liquid crystal lens and/or the frame frequency of the imaging device 3. When performing the autofocusing based on the focus signal successive extraction control, the autofocus controller 5 does not send the lens level acquire request, but instead, the liquid crystal lens controller 100 changes the lens level of the liquid crystal lens, and sends the lens level to the autofocus controller 5 each time the transient is response of the liquid crystal is completed. Then, the autofocus controller 5 computes the autofocus signal each time the lens level is acquired.

The present invention is not limited to the above-described embodiments, but various modifications can be made. For example, the dimensions, characteristic values, times, and other values described in each embodiment are illustrative only, and the invention is not limited by the specific values given herein. Furthermore, the type of liquid crystal is not limited to the nematic liquid crystal.

As described above, the automatic focusing apparatus according to the present invention is advantageous for used in apparatus having an autofocus function, and is particularly suited to implement an autofocus function in film cameras, digital cameras, movie cameras, cameras built into mobile phones, cameras mounted on vehicles, etc. for rear view monitoring, cameras adapted for use in endoscopes, eyewear having a function for varying the power of the lens, etc.

What is claimed is:

1. An automatic focusing apparatus comprising:
a liquid crystal lens whose focal length varies with an applied voltage;
a liquid crystal lens driving unit which applies a prescribed voltage to said liquid crystal lens;
an optical-to-electrical converter which produces an image signal from an optical image passed through said liquid crystal lens;
a temperature sensor which detects temperature near said liquid crystal lens; and
a control unit which can extract a plurality of focus signals either in accordance with focus signal collective extraction control in which the image signal output from said optical-to-electrical converter is sampled with said image signal acquisition period while causing said liquid crystal lens to undergo a transient response by applying said prescribed voltage by controlling said liquid crystal lens driving unit, or in accordance with focus signal successive extraction control in which the image signal output from said optical-to-electrical converter is sampled after liquid crystal in said liquid crystal lens has fully responded to the voltage applied to said liquid crystal lens when said voltage is varied by controlling said liquid crystal lens driving unit, wherein said control unit selects either said focus signal collective extraction control or said focus signal successive extraction control based on said temperature or on said image signal acquisition period, and controls said liquid crystal lens driving unit based on said extracted plurality of focus signals so that a maximum focus signal is achieved.

2. An automatic focusing apparatus according to claim 1, wherein said control unit estimates a time required for the transient response of said liquid crystal lens based on said temperature, and computes the number of focus signals obtainable during said transient response by dividing said estimated time by said image signal acquisition period, and wherein when the number of focus signals is not smaller than a prescribed number, said focus signal collective extraction control is selected, while when the number of focus signals is smaller than said prescribed number, said focus signal successive extraction control is selected.

3. An automatic focusing apparatus comprising:
- a liquid crystal lens whose focal length varies with an applied voltage;
- a liquid crystal lens driving unit which applies a prescribed voltage to said liquid crystal lens;
- an optical-to-electrical converter which produces an image signal from an optical image passed through said liquid crystal lens;
- a temperature sensor which detects temperature near said liquid crystal lens; and
- a control unit which adjusts said prescribed voltage based on the temperature near said liquid crystal lens or on an image signal acquisition period of said optical-to-electrical converter, acquires a signal representing focal length of said liquid crystal lens corresponding to a focus signal maximum value from a focus signal extracting unit for extracting a plurality of focus signals by sampling with said image signal acquisition period the image signal being output from said optical-to-electrical converter, and controls said liquid crystal lens driving unit based on said acquired signal.

* * * * *